(12) United States Patent
Ikeuchi et al.

(10) Patent No.: US 8,713,328 B2
(45) Date of Patent: Apr. 29, 2014

(54) CODE CONVERSION APPARATUS, CODE CONVERSION METHOD, AND COMPUTER PRODUCT

(75) Inventors: Kazuhiko Ikeuchi, Kawasaki (JP); Mikio Ito, Kawasaki (JP); Hidejirou Daikokuya, Kawasaki (JP); Kazuo Nakashima, Kawasaki (JP); Chikashi Maeda, Kawasaki (JP); Fumio Hanzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1478 days.

(21) Appl. No.: 12/068,232

(22) Filed: Feb. 4, 2008

(65) Prior Publication Data
US 2008/0148072 A1 Jun. 19, 2008

Related U.S. Application Data

(63) Continuation-in-part of application No. 11/790,275, filed on Apr. 24, 2007.

(30) Foreign Application Priority Data

Sep. 29, 2006 (JP) .................................. 2006-268011
Mar. 13, 2007 (JP) .................................. 2007-064027

(51) Int. Cl.
*G06F 12/14* (2006.01)
*H04L 29/06* (2006.01)
*H04L 9/32* (2006.01)
*G06F 12/00* (2006.01)
*G06F 17/30* (2006.01)

(52) U.S. Cl.
USPC ............. 713/193; 713/165; 713/168; 726/17; 726/27

(58) Field of Classification Search
USPC ........ 713/193, 165, 168; 380/277; 726/17, 27
See application file for complete search history.

(56) References Cited

U.S. PATENT DOCUMENTS 5,699,428 A * 12/1997 McDonnal et al. ........... 713/165
5,805,706 A * 9/1998 Davis ............................ 713/153
(Continued)

FOREIGN PATENT DOCUMENTS

CN 1633070 A 6/2005
CN 1818920 A 8/2006
(Continued)

OTHER PUBLICATIONS

U.S. Office Action issued in parent U.S. Appl. No. 11/790,275; mailed May 25, 2010.
(Continued)

*Primary Examiner* — Aravind Moorthy
(74) *Attorney, Agent, or Firm* — Staas & Halsey LLP

(57) ABSTRACT

A code conversion apparatus, a disk drive, a code buffer, and an encryption buffer are included in a storage. The code buffer stores therein first encrypted data present in the disk drive, and the encryption buffer stores therein first unencrypted data present in the disk drive. An encrypting unit encrypts the first unencrypted data present in the encryption buffer to predetermined encrypted data, and a decrypting unit decrypts the first encrypted data present in the code buffer to second unencrypted data. Moreover, a re-encrypting unit decrypts the first encrypted data present in the code buffer to third unencrypted data and encrypts the third unencrypted data to second encrypted data different from the first encrypted data.

12 Claims, 28 Drawing Sheets

(56) References Cited

U.S. PATENT DOCUMENTS

| | | | |
|---|---|---|---|
| 6,128,605 A * | 10/2000 | Saito et al. | 705/57 |
| 2002/0099517 A1 * | 7/2002 | Brendon et al. | 702/165 |
| 2004/0230817 A1 * | 11/2004 | Ma | 713/193 |
| 2006/0053308 A1 * | 3/2006 | Zimmerman | 713/193 |
| 2006/0179309 A1 | 8/2006 | Cross et al. | |
| 2006/0190426 A1 * | 8/2006 | Kanazawa et al. | 707/2 |
| 2006/0195704 A1 * | 8/2006 | Cochran et al. | 713/193 |
| 2007/0058801 A1 * | 3/2007 | Plotkin et al. | 380/28 |
| 2008/0080706 A1 * | 4/2008 | Ikeuchi et al. | 380/1 |
| 2008/0240429 A1 * | 10/2008 | Kito et al. | 380/45 |
| 2010/0313013 A1 * | 12/2010 | Ginter et al. | 713/155 |

FOREIGN PATENT DOCUMENTS

| | | |
|---|---|---|
| JP | 10-164511 | 6/1998 |
| JP | 2003-289304 | 10/2003 |
| JP | 2004-126323 | 4/2004 |
| JP | 2005-063478 | 3/2005 |
| JP | 2005-063481 | 3/2005 |
| JP | 2005-094790 | 4/2005 |
| JP | 2006-127061 | 5/2006 |
| JP | 2006-246541 | 9/2006 |
| JP | 2006-252328 | 9/2006 |
| JP | 2008-524754 | 7/2008 |
| JP | 2008-524969 | 7/2008 |
| WO | 97/10659 | 3/1997 |
| WO | 00/22777 | 4/2000 |
| WO | 2004/114115 | 12/2004 |
| WO | 2006/069273 | 6/2006 |
| WO | 2006/071725 | 7/2006 |

OTHER PUBLICATIONS

Chinese Office Action issued on Oct. 9, 2009 in corresponding Chinese Patent Application 200710103814.8.

Japanese Office Action for corresponding Japanese Application 2007-064027; mailed Jun. 14, 2011.

* cited by examiner

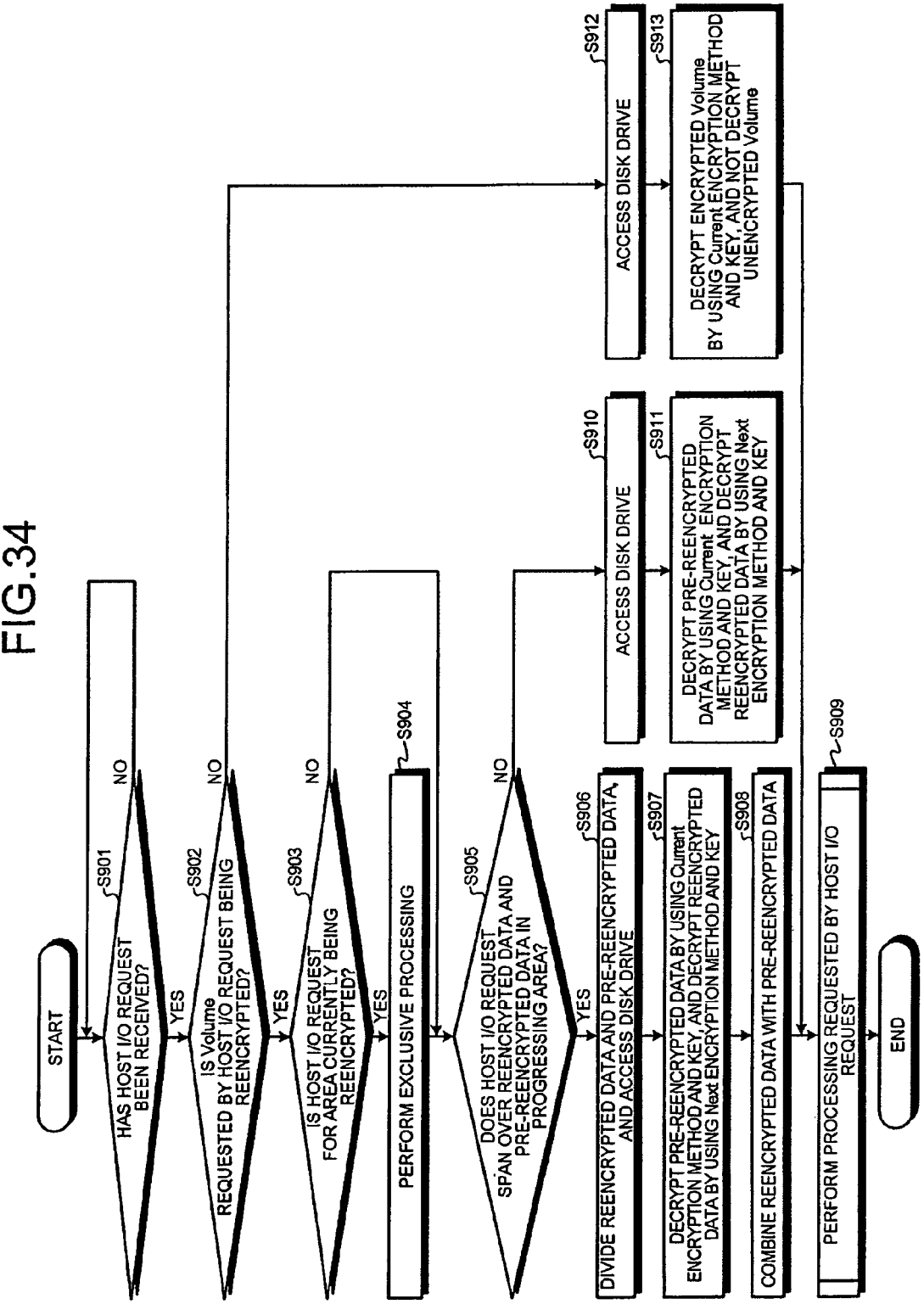

CODE CONVERSION APPARATUS, CODE CONVERSION METHOD, AND COMPUTER PRODUCT

CROSS-REFERENCE TO RELATED APPLICATIONS

This application is a continuation-in-part of U.S. patent application Ser. No. 11/790,275 filed on Apr. 24, 2007, which is based upon and claims priority based on Japanese Application 2006-268001 filed on Sep. 29, 2006, the contents of which are incorporated by reference. This application is also based upon and claims priority based on Japanese Application 2007-064027 filed on Mar. 13, 2007, the contents of which are incorporated by reference.

BACKGROUND OF THE INVENTION

1. Field of the Invention

The present invention relates to a technology for encrypting and decrypting data stored in a disk drive of a storage.

2. Description of the Related Art

In a storage that manages data stored in a plurality of disk drives that structures the storage, there has been a need to improve data security. In response to this, the data stored in the disk drives have been encrypted.

For example, a technique related to an encryption apparatus for encrypting data in the disk drive is disclosed in Japanese Patent Application Laid-open No. 2006-127061. The disclosed encryption apparatus is provided outside of the disk drive (storage). The encryption apparatus reads data stored in the disk drive to perform encrypting or decrypting, upon reception of an instruction to encrypt or decrypt the data from a user, and returns the encrypted or decrypted data to the disk drive.

In the conventional technique, however, because the encryption apparatus reads the data in the disk drive and then encrypts or decrypts the read data, it takes time to read the data in the disk drive. Accordingly, it takes time to encrypt or decrypt the data, and read/write requests from a host to the disk drive stagnate.

SUMMARY OF THE INVENTION

It is an object of the present invention to at least partially solve the problems in the conventional technology.

According to one aspect of the present invention, a code conversion apparatus that is included in a storage and that encrypts and decrypts data stored in a disk drive in the storage that manages the data includes an encrypted-data storage unit that stores, in a code buffer in the storage, first encrypted data present in the disk drive; an unencrypted-data storage unit that stores, in an encryption buffer in the storage, first unencrypted data present in the disk drive; an encrypting unit that encrypts the first unencrypted data present in the encryption buffer to predetermined encrypted data; a decrypting unit that decrypts the first encrypted data present in the code buffer to second unencrypted data; and a re-encrypting unit that decrypts the first encrypted data present in the code buffer to third unencrypted data and encrypts the third unencrypted data to second encrypted data different from the first encrypted data.

According to another aspect of the present invention, a method for encrypting and decrypting data stored in a disk drive in a storage that manages the data includes encrypted-data storing including storing a first encrypted data present in the disk drive, in a code buffer in the storage; unencrypted-data storing including storing first unencrypted data present in the disk drive, in an encryption buffer in the storage; encrypting the first unencrypted data present in the encryption buffer to predetermined encrypted data; decrypting the first encrypted data present in the code buffer to second unencrypted data; and re-encrypting including decrypting the first encrypted data present in the code buffer to third unencrypted data and encrypting the third unencrypted data to second encrypted data different from the first encrypted data.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 34 is a flowchart of a read/write control process performed by the storage shown in FIG. 29.

DETAILED DESCRIPTION OF THE PREFERRED EMBODIMENTS

Exemplary embodiments of the present invention will be explained below in detail with reference to the accompanying drawings. In the following embodiments, examples in which the present invention is applied to a storage as a memory are explained.

Figure 1:
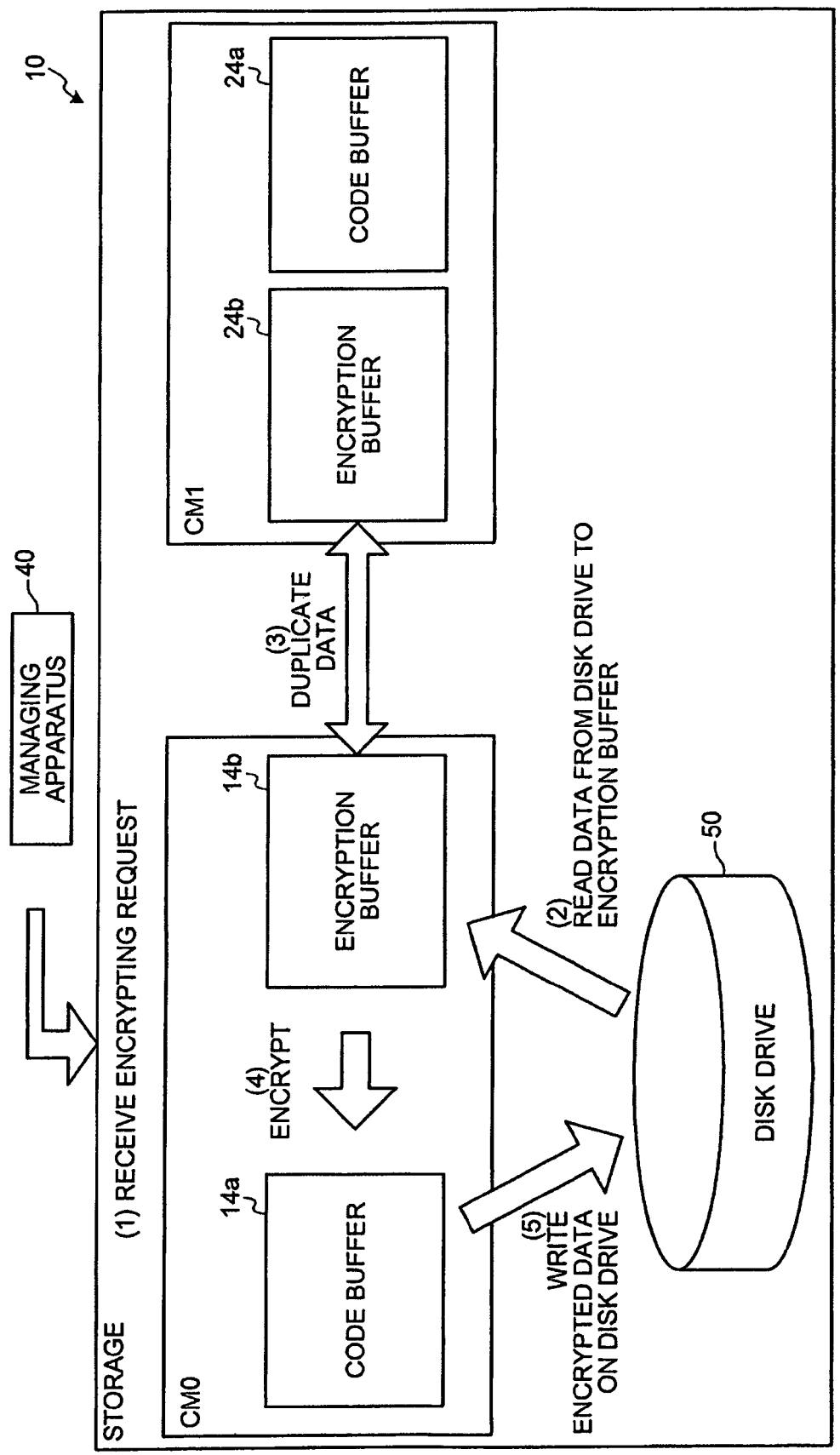
FIG. 1 is a schematic for explaining an outline and characteristics of a storage according to a first embodiment of the present invention.
Figure 2:
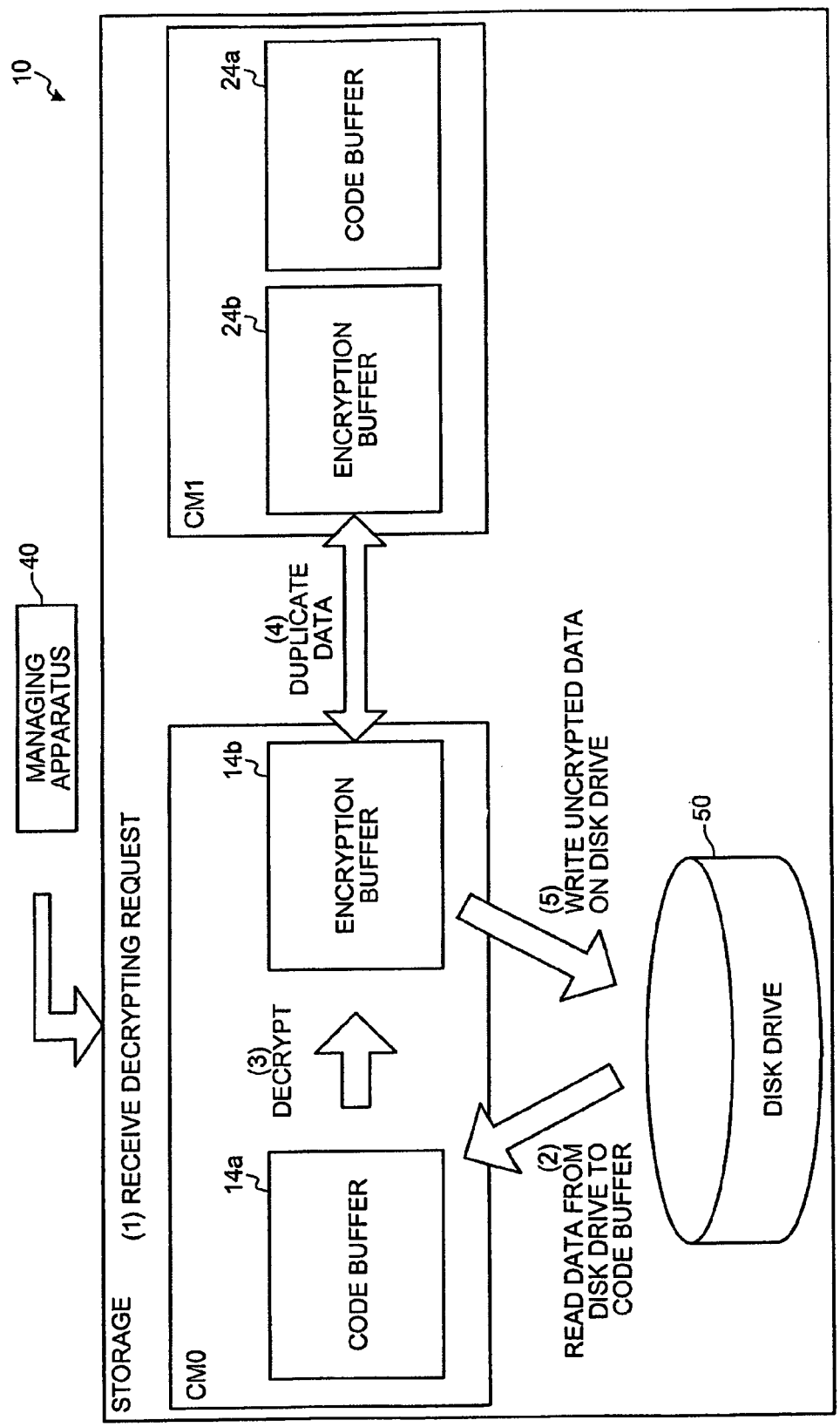
FIG. 2 is another schematic for explaining an outline and characteristics of the storage shown in FIG. 1.
Figure 3:
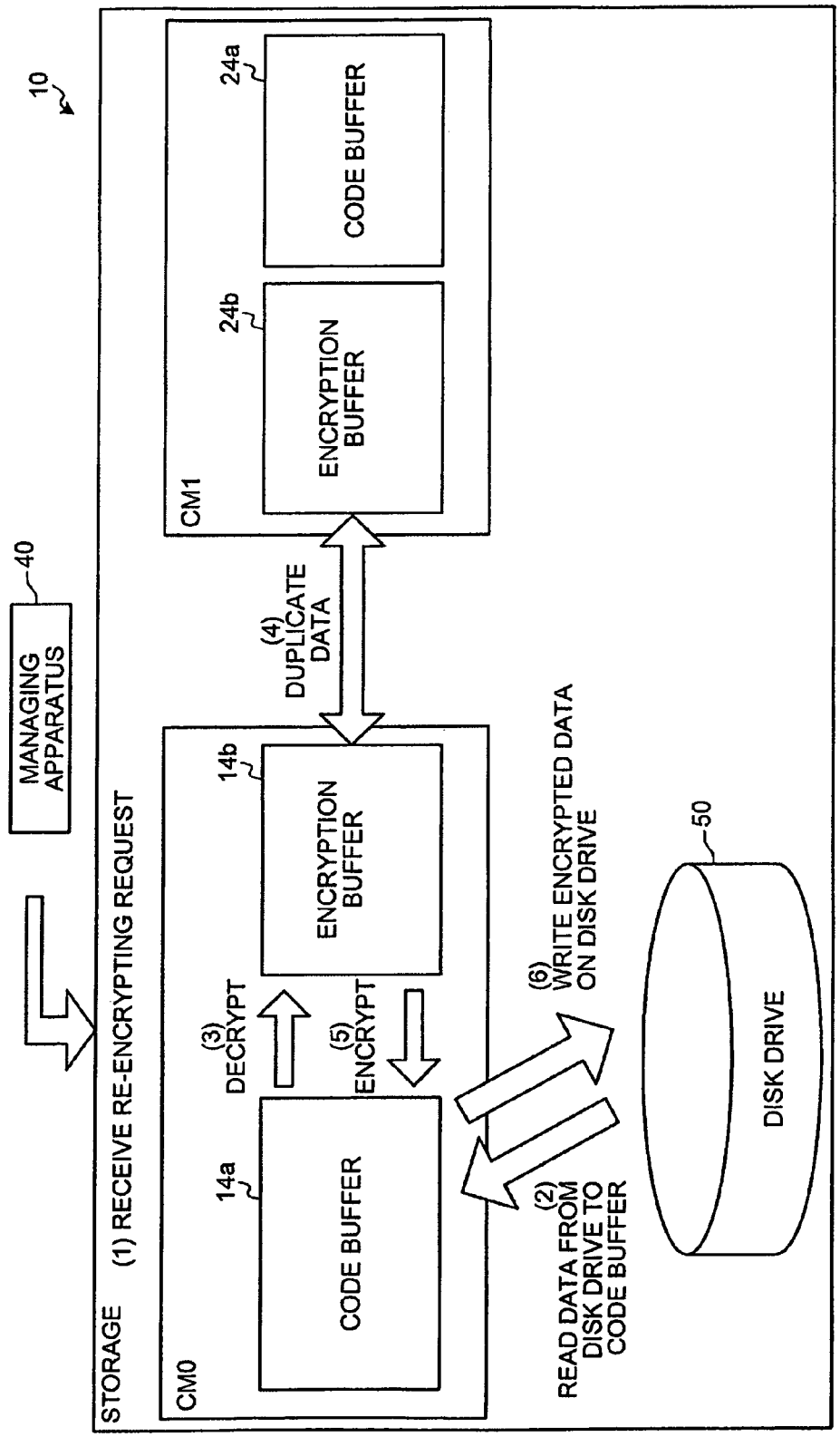
FIG. 3 is still another schematic for explaining an outline and characteristics of the storage shown in FIG. 1.

FIGS. 1 to 3 are schematics for explaining an outline and characteristics of a storage 10 according to a first embodiment of the present invention.

The storage 10 manages data stored in a disk drive 50, and encrypts or decrypts the data stored in the disk drive 50. A main characteristic of the storage 10 is that the data is encrypted or decrypted in the storage 10 without being read out to the outside of the storage 10, which enables to reduce the time for encrypting or decrypting data.

Specifically, the storage 10 includes, as shown in FIG. 1, a code buffer 14a that stores therein encrypted data stored in the disk drive 50, and an encryption buffer 14b that stores therein unencrypted data stored in the disk drive 50.

Upon receiving an encrypting request for a predetermined volume from a managing apparatus 40 (see (1) in FIG. 1), the storage 10 starts reading of the unencrypted data in the predetermined volume from the disk drive 50 to the encryption buffer 14b (see (2) is FIG. 1).

The storage 10 then makes unencrypted data redundant (see (3) in FIG. 1), and encrypts the unencrypted data to predetermined encrypted data (see (4) in FIG. 1). Specifically, the storage 10 duplicates the unencrypted data in the encryption buffer 14b to an encryption buffer 24b in a controller module (CM) 1, encrypts the unencrypted data to predetermined encrypted data, and transmits the encrypted data to a code buffer 24a. The storage 10 writes the encrypted data in the disk drive 50 (see (5) in FIG. 1).

A decrypting process is explained next with reference to FIG. 2. Upon reception of a decrypting request for a predetermined volume from the managing apparatus 40 (see (1) in FIG. 2), the storage 10 starts read of the encrypted data in the predetermined volume from the disk drive 50 to the code buffer 14a (see (2) in FIG. 2).

Next, the storage 10 decrypts the encrypted data stored in the code buffer 14a to the unencrypted data (see (3) in FIG. 2), and the decrypted data is made redundant (see (4) in FIG. 2). Specifically, the storage 10 decrypts the encrypted data, stores the decrypted data in the encryption buffer 14b, and duplicates the unencrypted data in the encryption buffer 14b. Subsequently, the storage 10 writes the decrypted unencrypted data in the disk drive 50 (see (5) in FIG. 2).

A re-encrypting process is explained with reference to FIG. 3. Upon reception of a re-encrypting request for a predetermined volume from the managing apparatus 40 (see (1) in FIG. 3), the storage 10 starts read of the encrypted data in the predetermined volume from the disk drive 50 to the code buffer 14a (see (2) in FIG. 3).

The storage 10 then decrypts the encrypted data stored in the code buffer 14a to unencrypted data (see (3) in FIG. 3), and the decrypted data is made redundant (see (4) in FIG. 3). Specifically, the storage 10 decrypts the encrypted data, stores the decrypted data in the encryption buffer 14b, and duplicates the unencrypted data in the encryption buffer 14b. The storage 10 then converts the duplicated unencrypted data to encrypted data different from the decrypted code (see (5) in FIG. 3) and writes the encrypted data in the disk drive 50 (see (6) in FIG. 3).

Thus, since data is encrypted or decrypted in the storage 10 without being read out to the outside of the storage 10, data encrypting time and decrypting time can be reduced.

Figure 4:
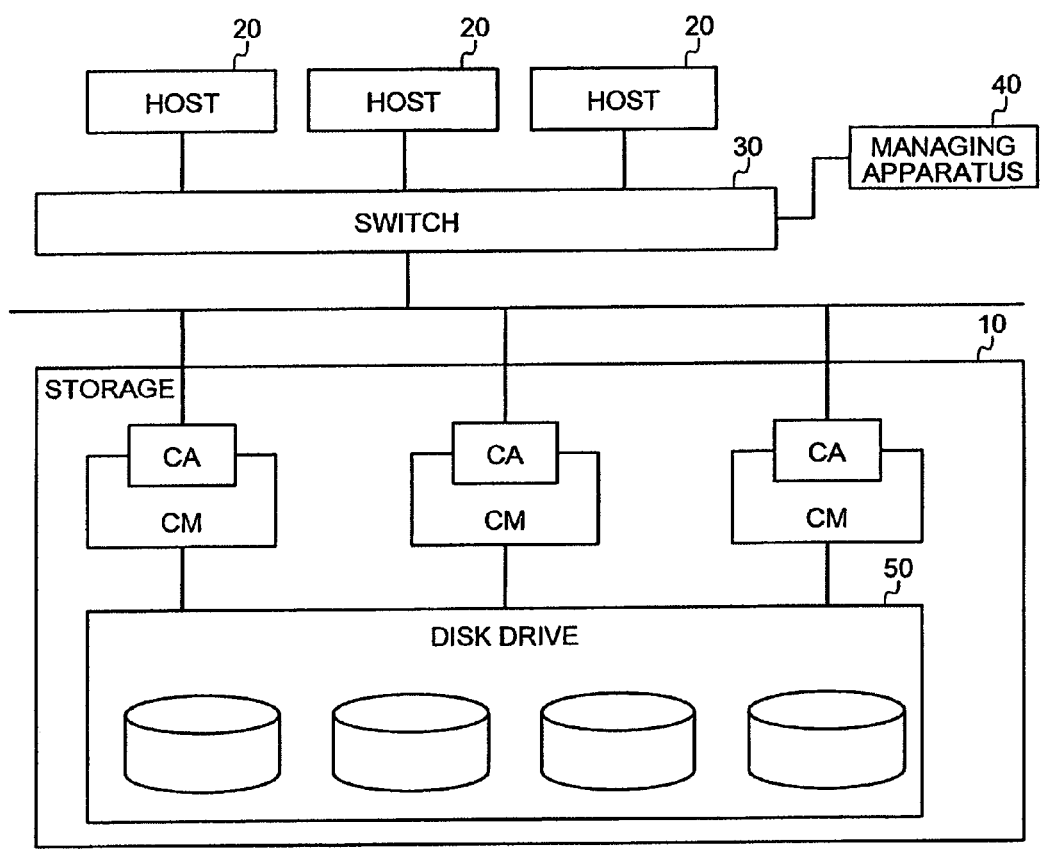
FIG. 4 is a block diagram of an entire system configuration including the storage shown in FIG. 1.

FIG. 4 is a block diagram of the entire system configuration including the storage 10.

As shown in FIG. 4, a storage system 1 includes the storage 10, hosts 20, a switch 30, and the managing apparatus 40. In the storage system 1, the storage 10, the hosts 20, and the managing apparatus 40 are connected with each other via the switch 30.

The host 20 transmits a host input/output (I/O) request for requesting read or write of data to the storage 10, to request read or write of data in the disk drive 50. The switch 30 adjusts a transfer destination of data in the storage 10, the hosts 20, and the managing apparatus 40. The managing apparatus 40 transmits to the storage 10 an encrypting request for requesting encryption of unencrypted data to encrypted data, a decrypting request for requesting decryption of encrypted data to unencrypted data, and a re-encrypting request for requesting conversion of encrypted data to a different code.

In the storage 10, a channel adapter (CA) in the CM receives a host I/O request from the host 20, and the CM controls read and write of data in the disk drive 50 using a cache (not shown). The storage 10 performs an encrypting process, a decrypting process, and a re-encrypting process corresponding to the encrypting request, decrypting request, and the re-encrypting request received from the managing apparatus 40, as background processes.

Figure 5:
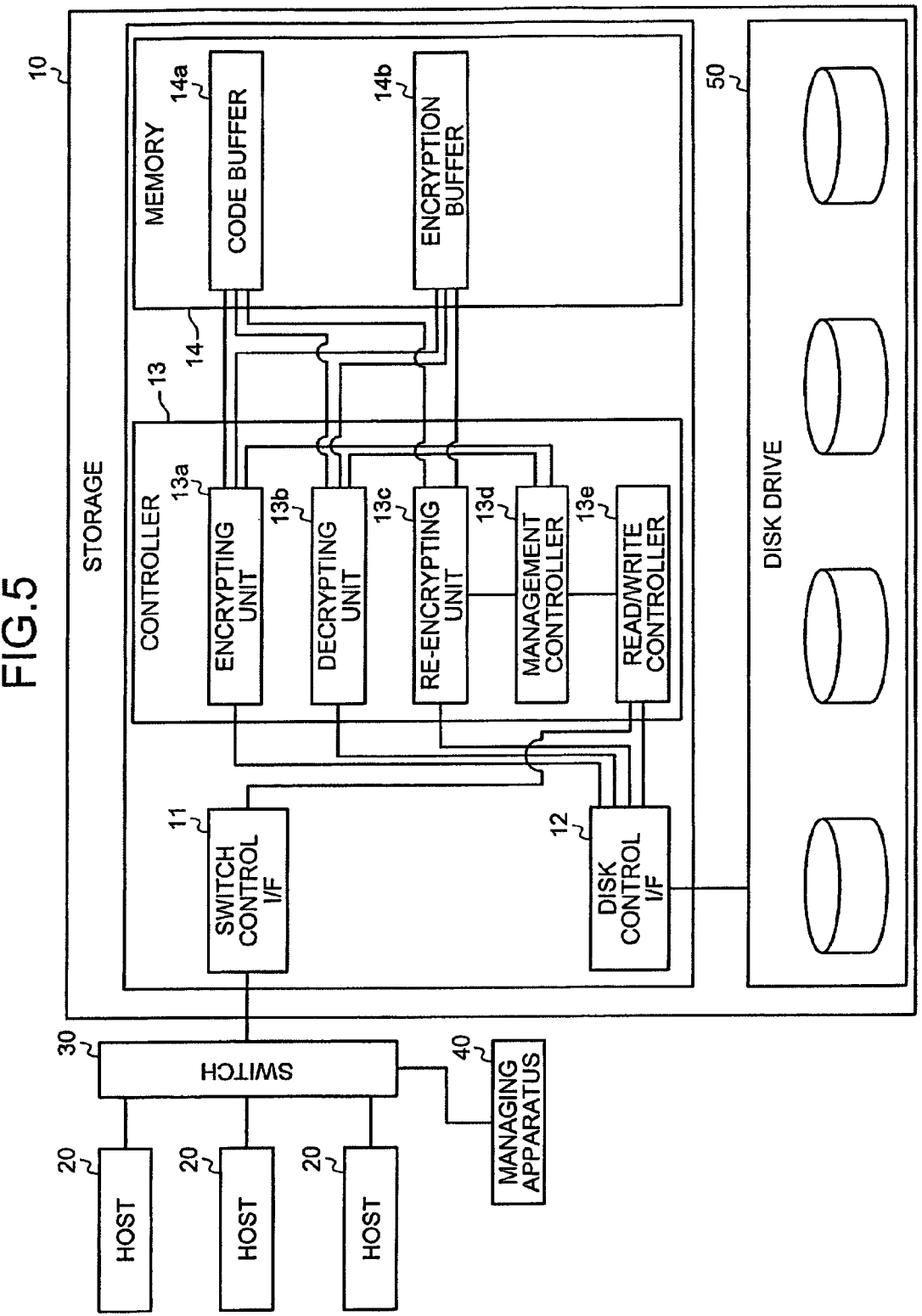
FIG. 5 is a block diagram of the storage shown in FIG. 1.
Figure 6:
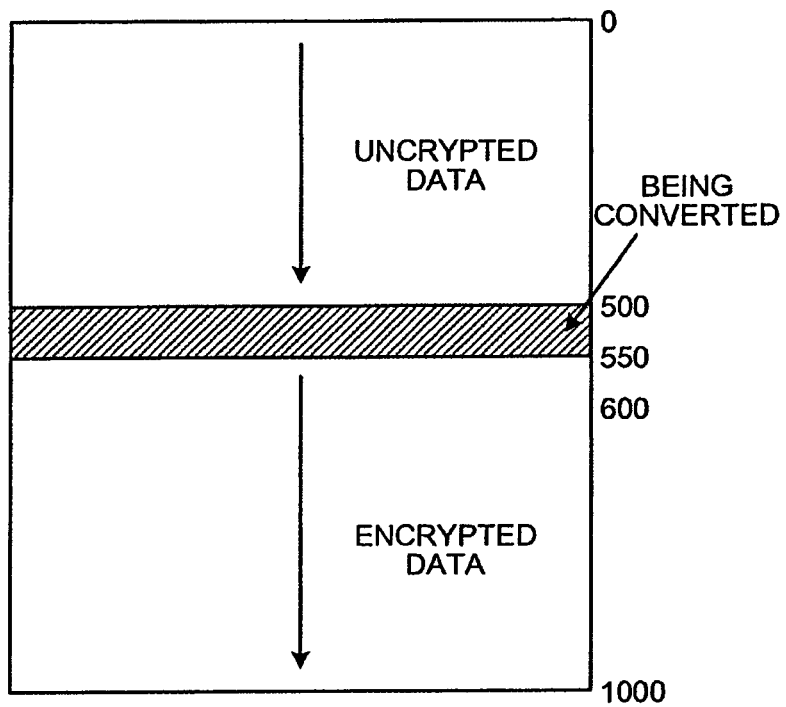
FIG. 6 is a schematic for explaining a progress monitoring process performed by a management controller shown in FIG. 5.
Figure 7:
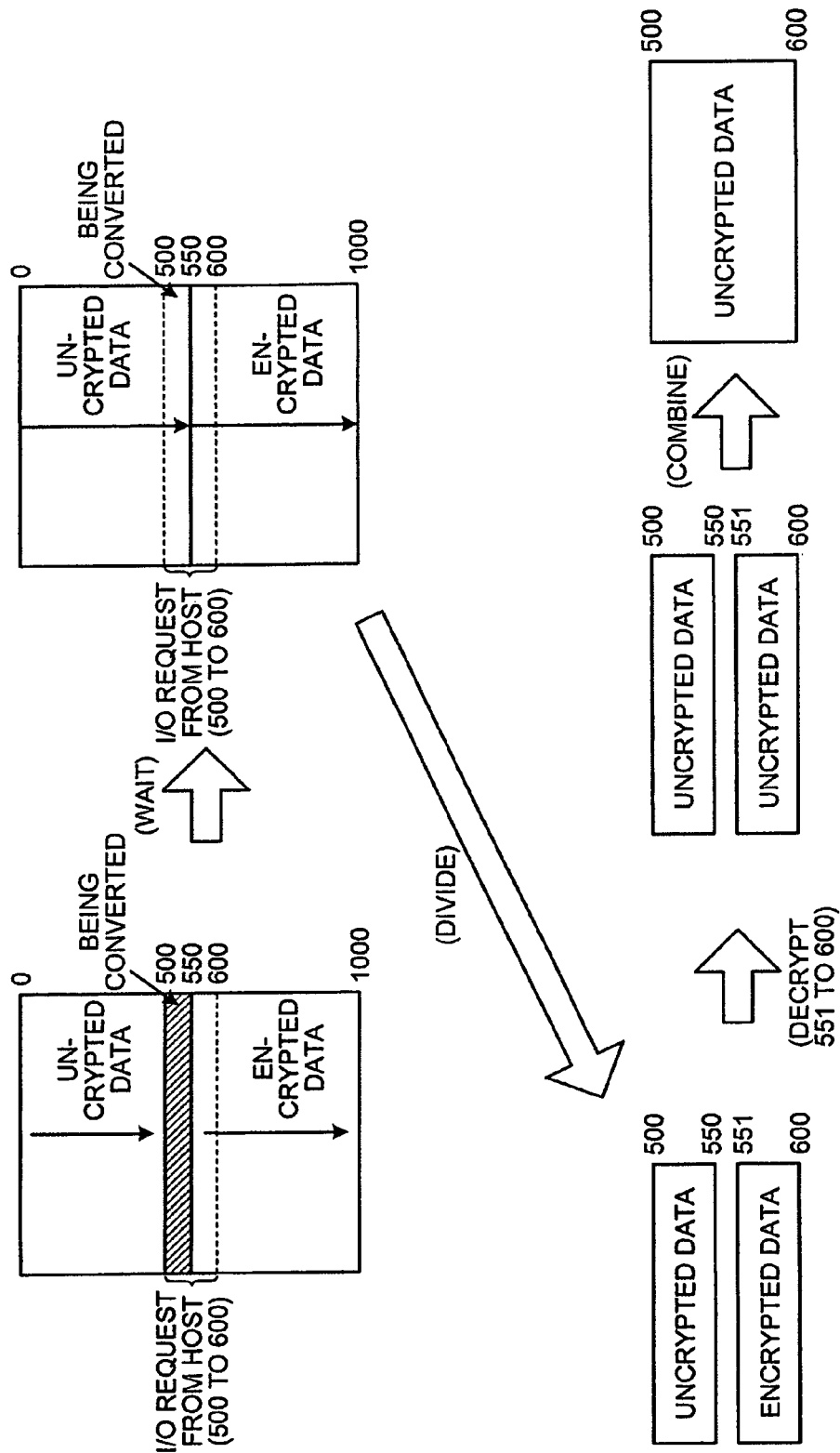
FIG. 7 is a schematic for explaining a read/write control process performed by a read/write controller shown in FIG. 5.

The configuration of the storage 10 is explained with reference to FIG. 5. FIG. 5 is a block diagram of the storage 10, FIG. 6 is a schematic for explaining a progress monitoring process, and FIG. 7 is a schematic for explaining a read/write control process. As shown in FIG. 5, the storage 10 includes a switch control I/F 11, a disk control I/F 12, a controller 13, and a memory 14, and is connected to the hosts 20 and the managing apparatus 40 via the switch 30.

The switch control I/F 11 controls communication of various pieces of information transferred between the host 20 to be connected to the storage 10 and the managing apparatus 40. Specifically, the switch control I/F 11 receives a host I/O request for requesting read or write of data from the host 20 and transmits the requested data stored in the disk drive 50. The switch control I/F 11 further receives encrypting requests, decrypting requests, and re-encrypting requests from the managing apparatus 40.

The disk control I/F 12 controls communication of various pieces of information transferred between the disk drive 50 to be connected to the storage 10 and the storage 10. Specifically, the disk control I/F 12 transfers encrypted data and unencrypted data between the disk drive 50 and the storage 10.

The memory 14 stores therein data and programs necessary for various types of processing performed by the controller 13. Particularly, the memory 14 includes the code buffer 14a and the encryption buffer 14b. The code buffer 14a stores therein encrypted data while the encryption buffer 14b stores therein unencrypted data. The memory 14 also stores therein an encryption key (not shown) used for encrypting and decrypting.

The controller 13 has an internal memory for storing therein a program specifying various processes and required data, and executes various processes. Particularly, the controller 13 includes an encrypting unit 13a, a decrypting unit 13b, a re-encrypting unit 13c, a management controller 13d, and a read/write controller 13e. The encrypting unit 13a corresponds to an "encrypting unit" in the appended claims, the decrypting unit 13b corresponds to a "decrypting unit" in the claims, and the re-encrypting unit 13c corresponds to a "re-encrypting unit" in the claims.

The encrypting unit 13a encrypts unencrypted data to predetermined encrypted data. Specifically, upon reception of an encrypting request for a predetermined volume from the managing apparatus 40, the encrypting unit 13a determines whether the encryption buffer 14b has been acquired in a memory area. As a result of the determination, when the encryption buffer 14b has not been acquired, the encrypting unit 13a acquires the encryption buffer 14b in the memory area. When the encryption buffer 14b has been acquired, the encrypting unit 13a starts read of unencrypted data in the predetermined volume from the disk drive 50 to the encryption buffer 14b.

The encrypting unit 13a duplicates the unencrypted data in the encryption buffer 14b, and encrypts the unencrypted data to predetermined encrypted data. The encrypting unit 13a then writes the encrypted data on the disk drive 50, and determines whether encrypting has finished to the end of the volume. As a result of the determination, if the encrypting has not finished to the end of the volume, the encrypting unit 13a reads the unencrypted data to the encryption buffer 14b, and repeats the encrypting process. When the encrypting has finished to the end of the volume, the encrypting unit 13a finishes the process.

The decrypting unit 13b decrypts encrypted data to unencrypted data. Specifically, upon reception of a decrypting request for a predetermined volume from the managing apparatus 40, the decrypting unit 13b determines whether the code buffer 14a has been acquired in the memory area. As a result of the determination, when the code buffer 14a has not been acquired, the decrypting unit 13b acquires the code buffer 14a in the memory area. When the code buffer 14a has been acquired, the decrypting unit 13b starts read of encrypted data in the predetermined volume from the disk drive 50 to the code buffer 14a.

The decrypting unit 13b decrypts the encrypted data and stores the decrypted data in the encryption buffer 14b. After duplicating the unencrypted data in the encryption buffer 14b, the decrypting unit 13b writes the decrypted data on the disk drive 50. Thereafter, the decrypting unit 13b determines whether decryption has finished to the end of the volume. As a result of the determination, if the decryption has not finished to the end of the volume, the decrypting unit 13b reads unencrypted data to the encryption buffer 14b, and repeats the decrypting process. The decrypting unit 13b finishes the process when the decryption has finished up to the end of the volume.

The re-encrypting unit 13c decrypts the encrypted data, and converts the decrypted data to a code different from the previous code. Specifically, upon reception of a re-encrypting request for a predetermined volume from the managing apparatus 40, the re-encrypting unit 13c determines whether the code buffer 14a has been acquired in the memory area. As a result of the determination, if the code buffer 14a has not been acquired, the re-encrypting unit 13c acquires the code buffer 14a in the memory area. When the code buffer 14a has been acquired in the memory area, the re-encrypting unit 13c starts read of encrypted data in the predetermined volume from the disk drive 50 to the code buffer 14a.

The re-encrypting unit 13c decrypts the encrypted data, stores the decrypted data in the encryption buffer 14b, duplicates the unencrypted data in the encryption buffer 14b, and converts the duplicated unencrypted data to encrypted data different from the code that has been decrypted. Thereafter, the re-encrypting unit 13c writes the encrypted data on the disk drive 50, and determines whether encrypting has finished to the end of the volume. As a result of the determination, if the encrypting has not finished to the end of the volume, the re-encrypting unit 13c reads the unencrypted data to the code buffer 14a, and repeats the re-encrypting process. When the encrypting has finished to the end of the volume, the re-encrypting unit 13c finishes the process.

The management controller 13d monitors data that is being encrypted or decrypted. Specifically, the management controller 13d monitors the progress of data that is being encrypted or decrypted by the encrypting unit 13a, the decrypting unit 13b, or the re-encrypting unit 13c. For example, the management controller 13d ascertains and monitors that data stored in the memory areas 500 to 550 in an example shown in FIG. 6 is being decrypted as a progressing condition.

The read/write controller 13e receives a host I/O request from the host 20, and controls read and write from/to the disk drive 50 based on the host I/O request, in response to the progressing condition monitored by the management controller 13d.

Specifically, upon reception of the host I/O request, the read/write controller 13e determines whether a volume requested by the host I/O request is being decrypted. As a result of the determination, if the volume requested by the host I/O request is not being decrypted, the read/write controller 13e determines whether data requested by the host I/O request is encrypted data. As a result of the determination, if the data is not the encrypted data, the read/write controller 13e directly accesses the disk drive 50, and performs processing requested by the host I/O request. On the other hand, when the data requested by the host I/O request is encrypted data, the read/write controller 13e decrypts the encrypted data, accesses the disk drive 50, and performs processing requested by the host I/O request.

When the volume requested by the host I/O request is being decrypted, the read/write controller 13e determines whether the host I/O request is for an area currently being decrypted. As a result of the determination, when the host I/O request is for the area currently being decrypted, the read/write controller 13e performs exclusive processing for waiting until the decryption finishes, and then determines whether the host I/O request spans over the encrypted data and the unencrypted data in the progressing area. On the other hand, when the host I/O request is not for the area currently being decrypted, the read/write controller 13e determines whether the host I/O request spans over the encrypted data and the unencrypted data in the requested area, without performing the exclusive processing.

As a result of the determination, if the host I/O request does not span over the encrypted data and the unencrypted data in the requested area, the read/write controller 13e accesses the disk drive 50, and determines whether the target data requested by the host I/O request is encrypted data. As a result of the determination, when the data is the encrypted data, the read/write controller 13e performs the processing requested by the host I/O request by decrypting the encrypted data. On the other hand, when the data is not the encrypted data, the read/write controller 13e performs the processing requested by the host I/O request without performing decryption.

On the other hand, when the host I/O request spans over the encrypted data and the unencrypted data, the read/write controller 13e divides the encrypted data and the unencrypted data, and accesses the disk drive for each of the encrypted data and the unencrypted data. The read/write controller 13e then decrypts the encrypted data, combines the decrypted data with the unencrypted data, and performs the processing requested by the host I/O request. Upon receiving a host I/O request requesting read of data including data currently being decrypted from the host 20, the read/write controller 13e transfers the host I/O request to a cache, and directly transmits the data to the host 20.

A specific example is explained with reference to FIG. 7. Upon receiving a host I/O request (a host I/O request for data stored in memory areas 500 to 600 in FIG. 7), since the data requested by the host I/O request is currently being decrypted (500 to 550 are being decrypted in FIG. 7), the read/write controller 13e performs exclusive processing for waiting until decryption is finished. The read/write controller 13e then divides the unencrypted data and encrypted data in the progress (unencrypted data in 500 to 550 and encrypted data in 551 to 600 in FIG. 7), and accesses the disk drive for each of the encrypted data and the unencrypted data. The read/write controller 13e then decrypts the encrypted data, combines the decrypted data with the unencrypted data, and performs processing requested by the host I/O request.

An encrypting process performed by the storage 10 is explained with reference to FIG. 8.

Figure 8:
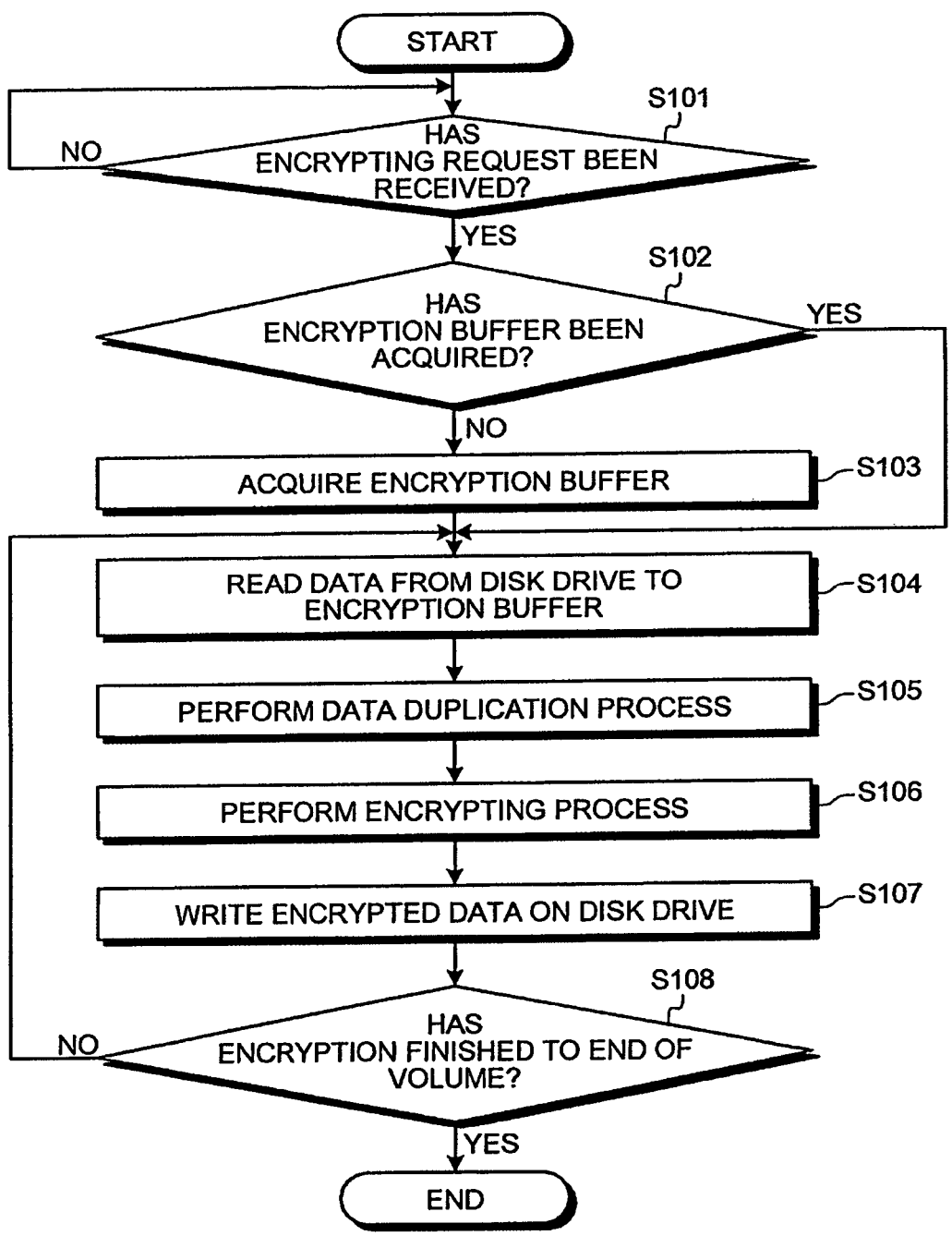
FIG. 8 is a flowchart of an encrypting process performed by an encrypting unit shown in FIG. 5.

As shown in FIG. 8, upon reception of an encrypting request for a predetermined volume from the managing apparatus 40 (YES at step S101), the encrypting unit 13a in the storage 10 determines whether the encryption buffer 14b has been acquired in the memory area (step S102). As a result of the determination, when the encryption buffer 14b has not been acquired (NO at step S102), the encrypting unit 13a acquires the encryption buffer 14b in the memory area (step S103), and starts read of the unencrypted data in the predetermined volume from the disk drive 50 to the encryption buffer 14b (step S104). When the encryption buffer 14b has been acquired in the memory area (YES at step S102), the encrypting unit 13a directly starts read of the unencrypted data in the predetermined volume from the disk drive 50 to the encryption buffer 14b (step S104).

The encrypting unit 13a duplicates the unencrypted data in the encryption buffer 14b (step S105), and encrypts the unencrypted data to predetermined encrypted data (step S106). The encrypting unit 13a writes the encrypted data on the disk drive 50 (step S107), and determines whether encryption has finished to the end of the volume (step S108). As a result of the determination, if the encryption has not finished to the end of the volume (NO at step S108), the encrypting unit 13a reads the unencrypted data to the encryption buffer 14b (step S104), and repeats the encrypting process. When the encryption has finished to the end of the volume (YES at step S108), the encrypting unit 13a finishes the process.

A decrypting process performed by the storage 10 is explained with reference to FIG. 9.

Figure 9:
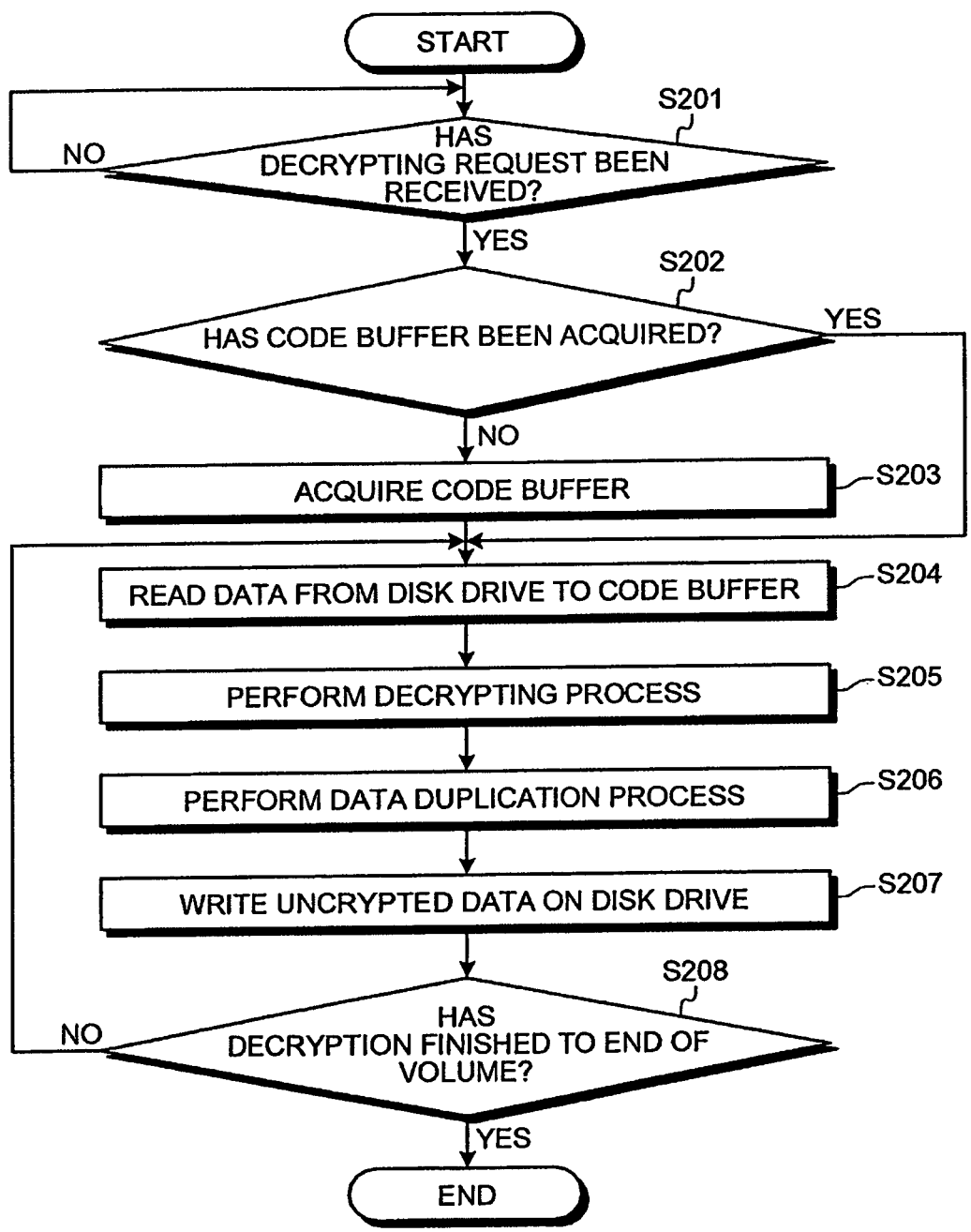
FIG. 9 is a flowchart of a decrypting process performed a decrypting unit shown in FIG. 5.

As shown in FIG. 9, upon reception of a request for decrypting a predetermined volume from the managing apparatus 40 (YES at step S201), the decrypting unit 13b in the storage 10 determines whether the code buffer 14a has been acquired in the memory area (step S202). As a result of the determination, when the code buffer 14a has not been acquired (NO at step S202), the decrypting unit 13b acquires the code buffer 14a in the memory area (step S203). When the code buffer 14a has been acquired in the memory area (YES at step S202), the decrypting unit 13b starts read of the encrypted data in the predetermined volume from the disk drive 50 to the code buffer 14a (step S204).

The decrypting unit 13b decrypts the encrypted data and stores the decrypted data in the encryption buffer 14b (step S205). Thereafter, the decrypting unit 13b duplicates the unencrypted data in the encryption buffer 14b (step S206), and writes the decrypted data on the disk drive 50 (step S207). Thereafter, the decrypting unit 13b determines whether decryption has finished to the end of the volume (step S208). As a result of the determination, if the decryption has not finished to the end of the volume (NO at step S208), the decrypting unit 13b reads the encrypted data to the encryption buffer 14b (step S204), and repeats the decrypting process. When the decryption has finished to the end of the volume (YES at step S208), the decrypting unit 13b finishes the process.

A re-encrypting process performed by the storage 10 is explained with reference to FIG. 10.

Figure 10:
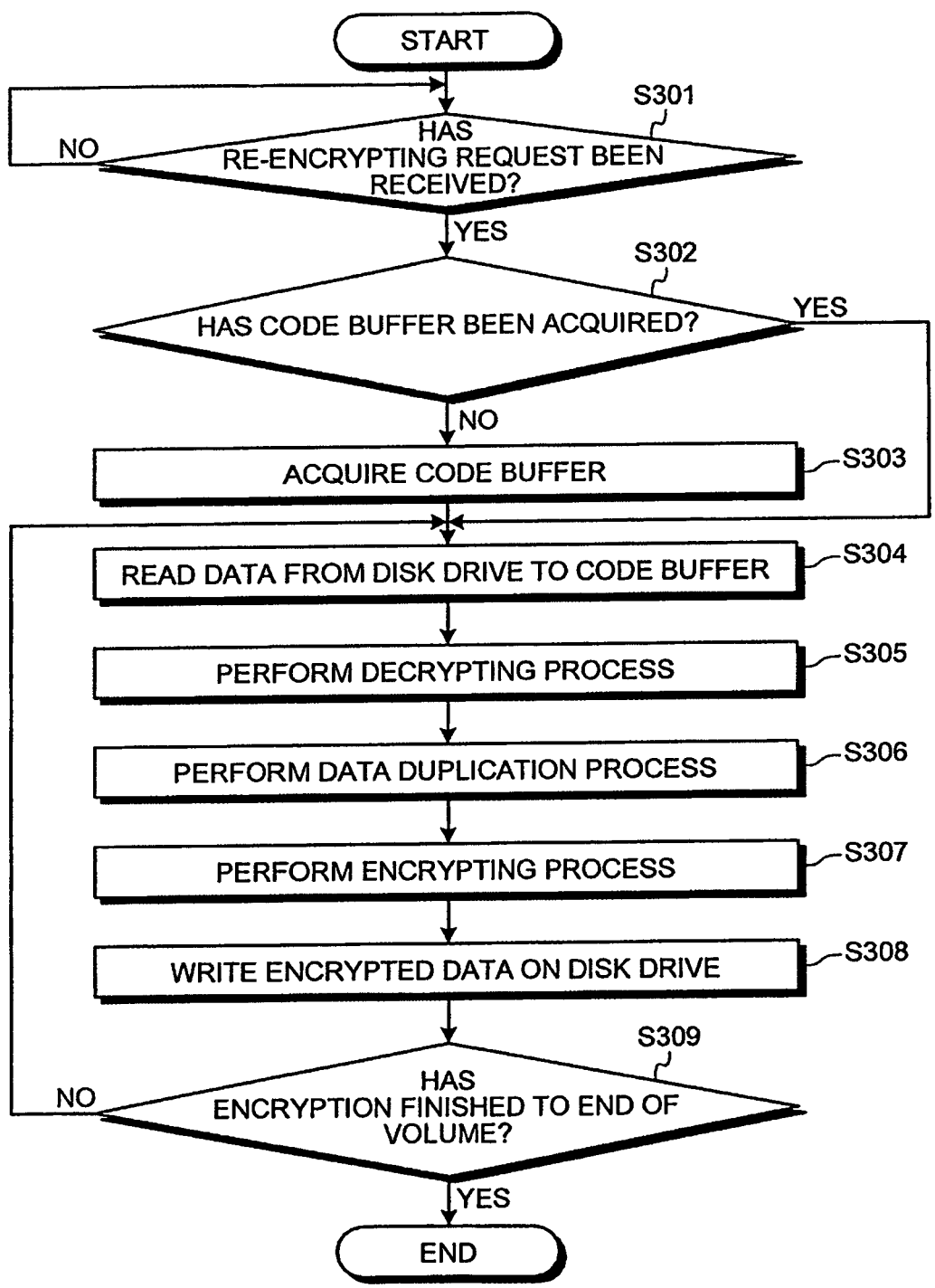
FIG. 10 is a flowchart of a re-encrypting process performed by a re-encrypting unit shown in FIG. 5.

As shown in FIG. 10, upon reception of a re-encrypting request of a predetermined volume from the managing apparatus 40 (YES at step S301), the re-encrypting unit 13c in the storage 10 determines whether the code buffer 14a has been acquired in the memory area (step S302). As a result of the determination, when the code buffer 14a has not been acquired (NO at step S302), the re-encrypting unit 13c acquires the code buffer 14a in the memory area (step S303). When the code buffer 14a has been acquired in the memory area (YES at step S302), the re-encrypting unit 13c starts read of the unencrypted data in the predetermined volume from the disk drive 50 to the code buffer 14a (step S304).

The re-encrypting unit 13c decrypts the encrypted data and stores the decrypted data in the encryption buffer 14b (step S305). Thereafter, the re-encrypting unit 13c duplicates the unencrypted data in the encryption buffer 14b (step S306), and converts the duplicated unencrypted data to encrypted data different from the code to which the data was encrypted before being decrypted at step S305 (step S307). Thereafter, the re-encrypting unit 13c writes the encrypted data on the disk drive 50 (step S308), and determines whether encryption has finished to the end of the volume (step S309). As a result of the determination, if the encryption has not finished to the end of the volume (NO at step S309), the re-encrypting unit 13c reads the unencrypted data to the code buffer 14a (step S304), and repeats the encrypting process. When the encryption has finished to the end of the volume (YES at step S309), the re-encrypting unit 13c finishes the process.

A read/write control process performed by the storage 10 is explained with reference to FIG. 11.

Figure 11:
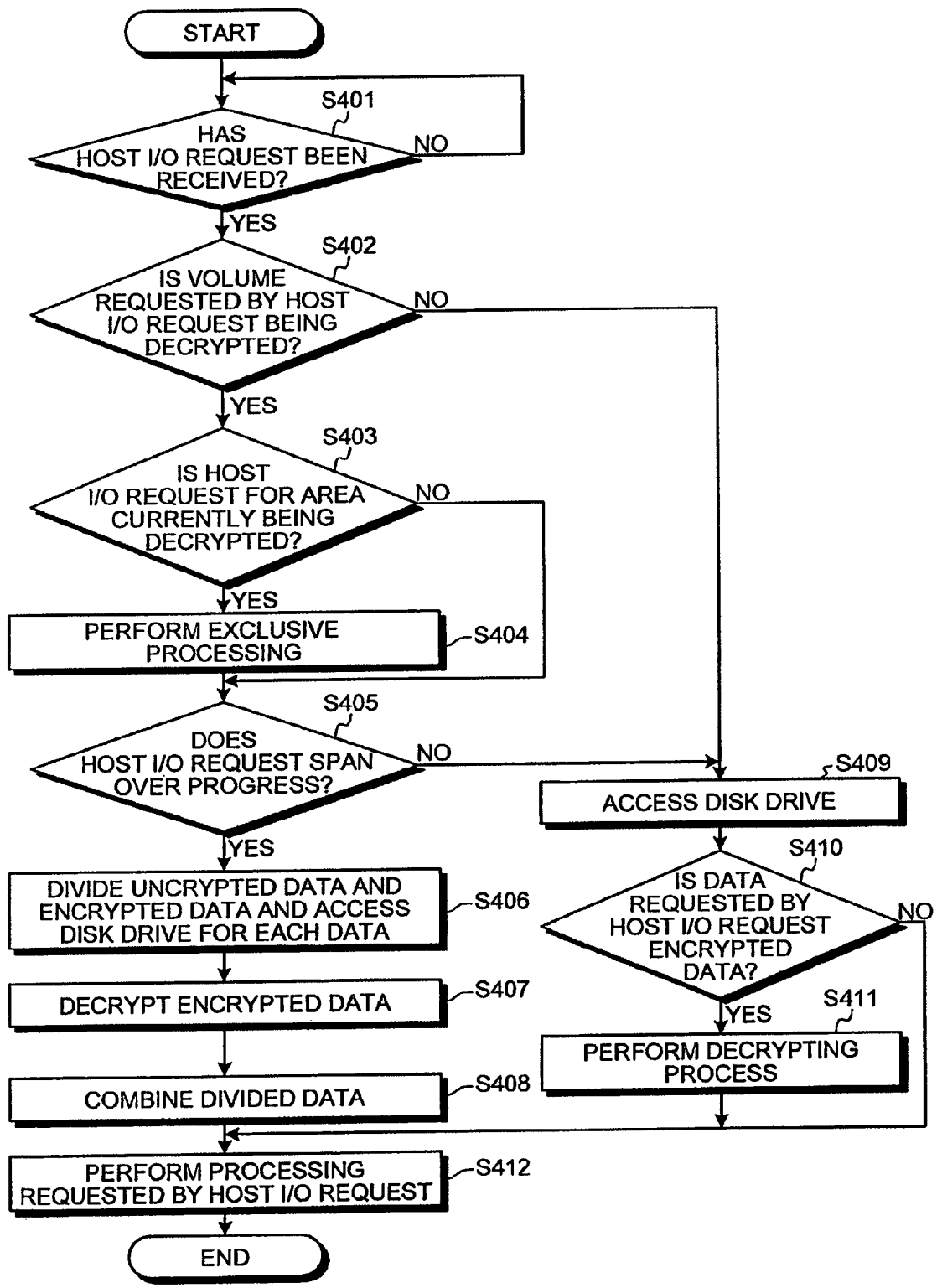
FIG. 11 is a flowchart of a read/write control process performed by read/write controller shown in FIG. 5.

As shown in FIG. 11, upon reception of a host I/O request (YES at step S401), the read/write controller 13e in the storage 10 determines whether a volume requested by the host I/O request is being decrypted (step S402). As a result of the determination, if the volume requested by the host I/O request is not being decrypted (NO at step S402), the read/write controller 13e accesses the disk drive 50 (step S409), and determines whether the data requested by the host I/O request is encrypted data (step S410). When the data is not encrypted data (NO at step S410), the read/write controller 13e performs processing requested by the host I/O request (step S412). On the other hand, when the data requested by the host I/O request is encrypted data (YES at step S410), the read/write controller 13e performs the decrypting process (step S411), and subsequently performs the processing requested by the host I/O request (step S412).

When the volume requested by the host I/O request is being decrypted (YES at step S402), the read/write controller 13e determines whether the host I/O request is for an area currently being decrypted (step S403). As a result of the determination, when the host I/O request is for the area currently being decrypted (YES at step S403), the read/write controller 13e performs exclusive processing for waiting until the decryption finishes (step S404), and then determines whether the host I/O request spans over the encrypted data and the unencrypted data in the progressing area (step S405). On the other hand, when the host I/O request is not for the area currently being decrypted (NO at step S403), the read/write controller 13e determines whether the host I/O request spans over the encrypted data and the unencrypted data in a requested area (step S405), without performing the exclusive processing.

Accordingly, when the host I/O request does not span over the encrypted data and the unencrypted data in a requested area (NO at step S405), the read/write controller 13e accesses the disk drive 50 (step S409), and determines whether the data requested by the host I/O request is encrypted data (step S410). As a result of the determination, when the data is encrypted data (YES at step S410), the read/write controller 13e performs the decrypting process (step S411), and also performs the processing requested by the host I/O request (step S412). On the other hand, when the data is not encrypted data (NO at step S410), the read/write controller 13e performs processing requested by the host I/O request without performing decryption (step S412).

On the other hand, when the host I/O request spans over the encrypted data and the unencrypted data in the requested area (YES at step S405), the read/write controller 13e divides the encrypted data and the unencrypted data, and accesses the disk drive for each of the encrypted data and the unencrypted data (step S406). Subsequently, the read/write controller 13e decrypts the encrypted data (step S407), combines the decrypted data with the unencrypted data (step S408), and performs the processing requested by the host I/O request (step S412).

As explained above, the storage 10 stores the encrypted data stored on the disk drive 50 in the code buffer 14a in the storage 10, stores the unencrypted data stored on the disk drive 50 in the encryption buffer 14b in the storage 10, encrypts the stored unencrypted data to predetermined encrypted data, decrypts the stored encrypted data to unencrypted data, and converts the decrypted unencrypted data to encrypted data different from the code before being decrypted. Accordingly, because the data is encrypted or decrypted inside the storage 10, the time required for encrypting or decrypting the data can be reduced.

Furthermore, according to the first embodiment, the stored unencrypted data is made redundant and converted to predetermined encrypted data, and the encrypted data is written on the disk drive 50. The stored encrypted data is decrypted to unencrypted data, and the decrypted data is made redundant and written on the disk drive 50. The stored encrypted data is decrypted to unencrypted data, the decrypted data is made redundant and converted to different encrypted data, and the encrypted data is written on the disk drive. Accordingly, unencrypted data can be converted to encrypted data, encrypted data can be converted to unencrypted data, and encrypted data can be converted to different encrypted data. Furthermore, since data is made redundant, data is hardly lost.

Moreover, according to the first embodiment, the progress of the encryption and the decryption of data is monitored, and when a read/write request for requesting the disk drive to read and write data is received during the encryption and the decryption, read and write are controlled based on the read/write request corresponding to the monitored progress. Therefore, read and write can be controlled based on the read/write request corresponding to the progress of the encryption and the decryption of data.

Furthermore, according to the first embodiment, when the read/write request for requesting read/write of data including data currently being decrypted is received, after waiting for completion of decryption, the read-requested data is divided into encrypted data and unencrypted data to read respective data, the read encrypted data is decrypted and combined with the unencrypted data, and read of the combined data is controlled. Therefore, the encrypted data is separated from the unencrypted data, and the encrypted data does not need to be decrypted. Therefore, the time required for the read/write control can be reduced.

Moreover, according to the first embodiment, when a read/write request for requesting read/write of data including data currently being decrypted is received, the data currently being decrypted is decrypted and stored in the encryption buffer 14b, and then read from the encryption buffer 14b is controlled.

Furthermore, according to the first embodiment, when a read/write request for requesting read/write of data including data currently being decrypted is received, the data currently being decrypted is decrypted and stored in the encryption buffer 14b, and then read from the encryption buffer 14b is controlled. Accordingly, the data stored in the encryption buffer 14b does not need to be read from the disk drive 50, and the time required for read/write control can be reduced.

In the first embodiment, a case that when a host I/O request is for an area currently being decrypted, the exclusive processing for waiting for completion of decryption is performed, and the processing corresponding to the host I/O request is subsequently performed has been explained. However, the present invention is not limited thereto, and the processing corresponding to the host I/O request can be performed without waiting for completion of decryption.

Figure 12:
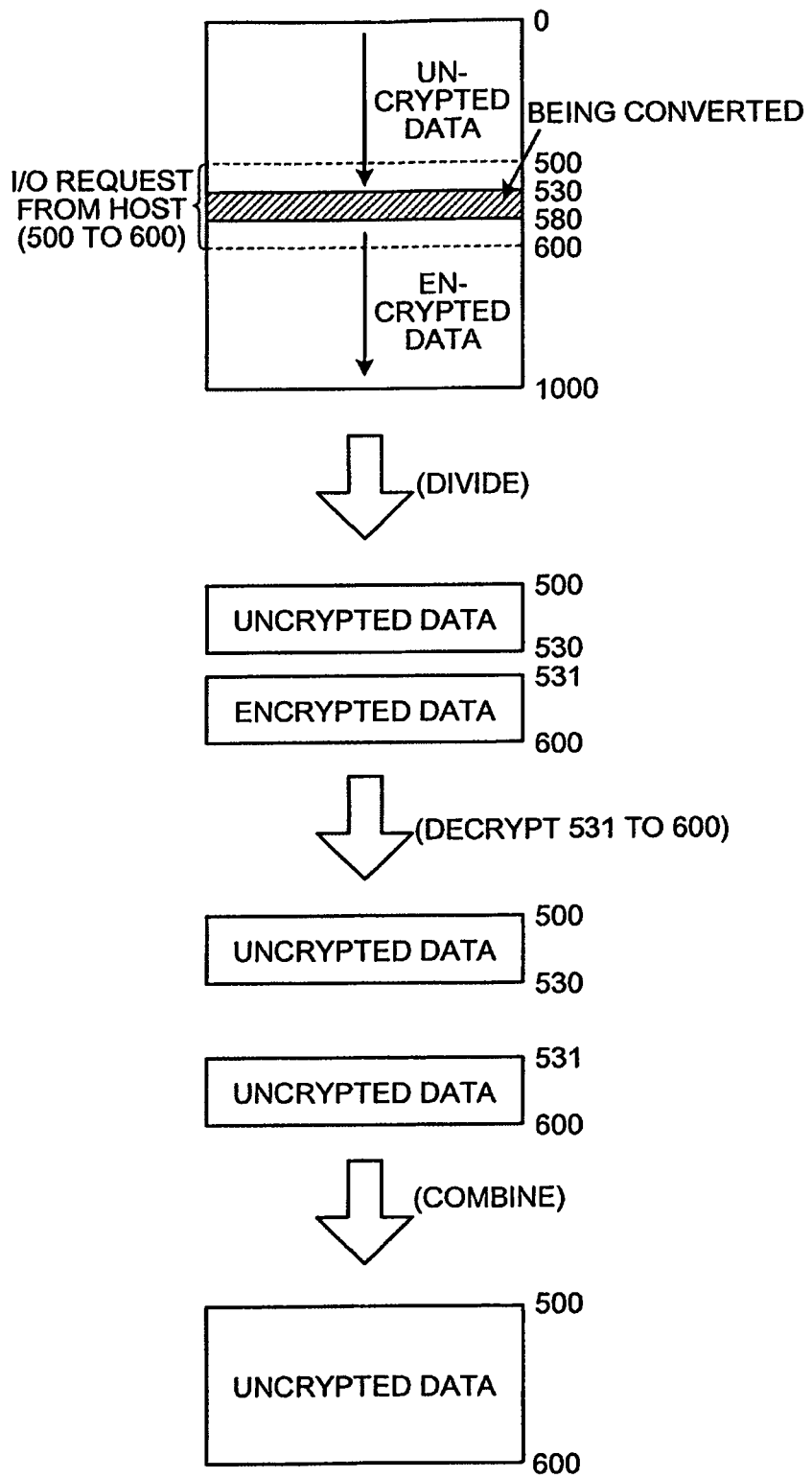
FIG. 12 is a schematic for explaining a read/write control process performed by a storage according to a second embodiment of the present invention.

The storage 10 according to a second embodiment of the present invention is explained with reference to FIGS. 12 and 13 as an example in which the processing corresponding to the host I/O request is performed without waiting for completion of decryption. FIG. 12 is a detailed schematic for explaining the read/write control process performed by the storage 10 according to the second embodiment, and FIG. 13 is a flowchart of a read/write control process performed by the storage 10 according to the second embodiment.

As shown in FIG. 12, upon reception of a host I/O request (a host I/O request is received for data stored in memory areas 500 to 600 in FIG. 12), similarly to the first embodiment, the storage 10 according to the second embodiment divides the data, for which the host I/O request has been received, into unencrypted data and encrypted data (data currently being decrypted and encrypted data). The storage 10 according to the second embodiment then decrypts the encrypted data and combines the decrypted data with the unencrypted data. After converting all the data, for which the host I/O request has been received, to unencrypted data, the storage 10 according to the second embodiment performs the processing corresponding to the host I/O request.

The read/write control process performed by the storage 10 according to the second embodiment is explained with reference to FIG. 13. The read/write control process in the second embodiment is different from the read/write control process in the first embodiment shown in FIG. 11 in that the exclusive processing is not performed.

Figure 13:
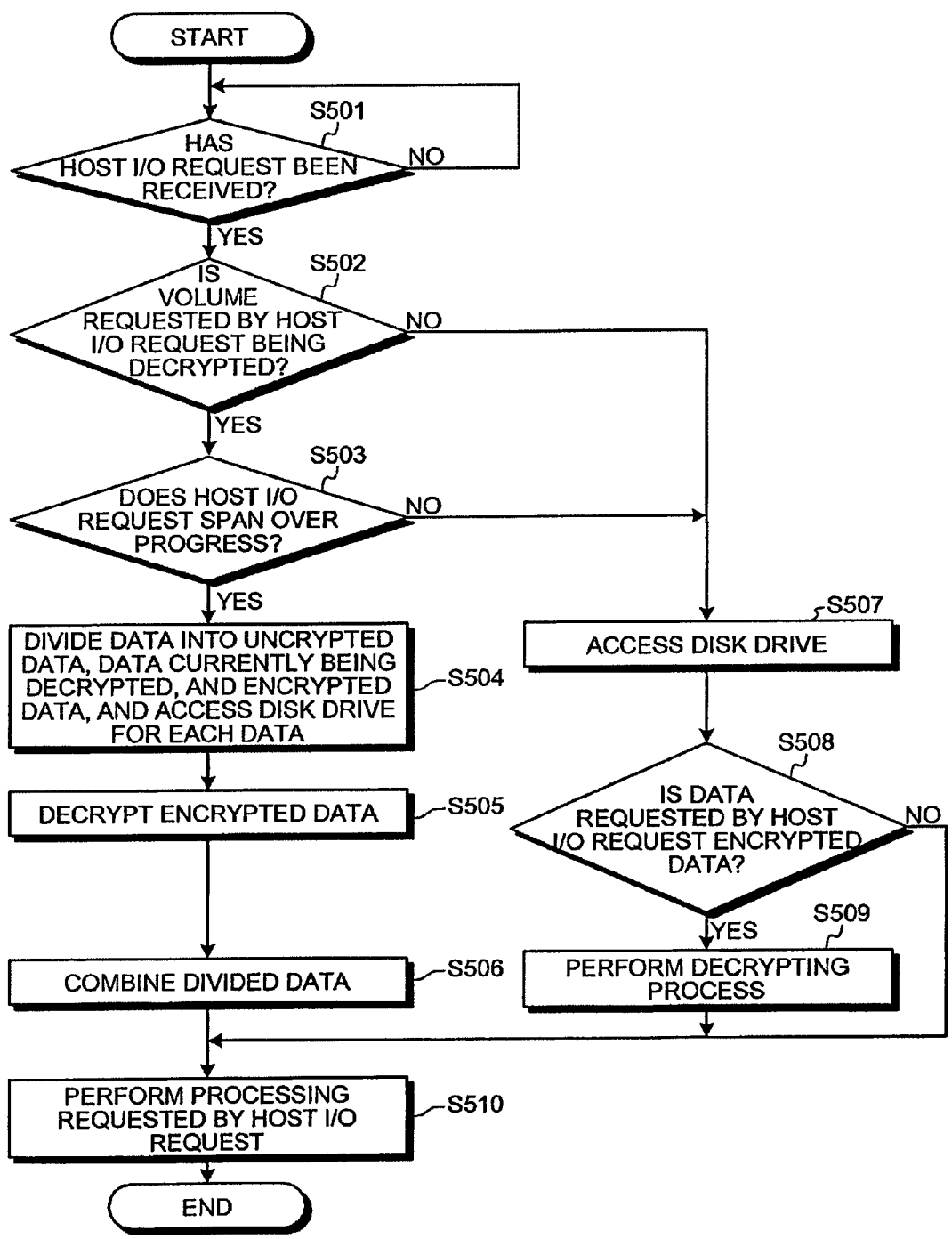
FIG. 13 is a flowchart of the read/write control process shown in FIG. 12.

In other words, as shown in FIG. 13, upon reception of a host I/O request (YES at step S501), the read/write controller 13e in the storage 10 according to the second embodiment determines whether the volume requested by the host I/O request is being decrypted (step S502). As a result of the determination, when the volume requested by the host I/O request is being decrypted (YES at step S502), the read/write controller 13e determines whether the host I/O request spans over the encrypted data and the unencrypted data in the progressing condition (step S503).

As a result of the determination, when the host I/O request spans over the encrypted data and the unencrypted data in the progressing area (YES at step S503), the read/write controller 13e divides the data into unencrypted data, data currently being decrypted, and encrypted data, and accesses the disk drive 50 to read respective data (step S504). The read/write controller 13e decrypts the encrypted data similarly to the first embodiment (step S505), combines the decrypted data with the unencrypted data (step S506), and performs the processing requested by the host I/O request (step S510).

When the volume requested by the host I/O request is not being decrypted (NO at step S502), or when the host I/O request does not span over the encrypted data and the unencrypted data (NO at step S503), the read/write controller 13e accesses the disk drive 50 (step S507), similarly to the first embodiment, and determines whether the data requested by the host I/O request is encrypted data (step S508). As a result of the determination, when the data is encrypted data (YES at step S508), the read/write controller 13e performs the decrypting process (step S509) and then performs processing requested by the host I/O request (step S510). On the other hand, when the data is not encrypted data (NO at step S508), the read/write controller 13e performs processing requested by the host I/O request without performing the decrypting process (step S510).

Thus, in the second embodiment, upon reception of a read/write request for read/write of the data including data being decrypted, the read/write controller 13e divides the read-requested data into each of unencrypted data, data currently being decrypted, and encrypted data. The read/write controller 13e decrypts each of the divided data currently being decrypted and encrypted data, and combines those data with the unencrypted data, thereby controlling read/write of the combined data. As a result, since the encrypted data is concurrently decrypted to the unencrypted data without waiting for the data being decrypted, the time required for the read/write control can be reduced.

The encryption buffer in the storage can be formed of a local area for storing the unencrypted data as local data and a mirror area for storing the unencrypted data as mirror data corresponding to the local data stored by another encryption buffer.

Figure 14:
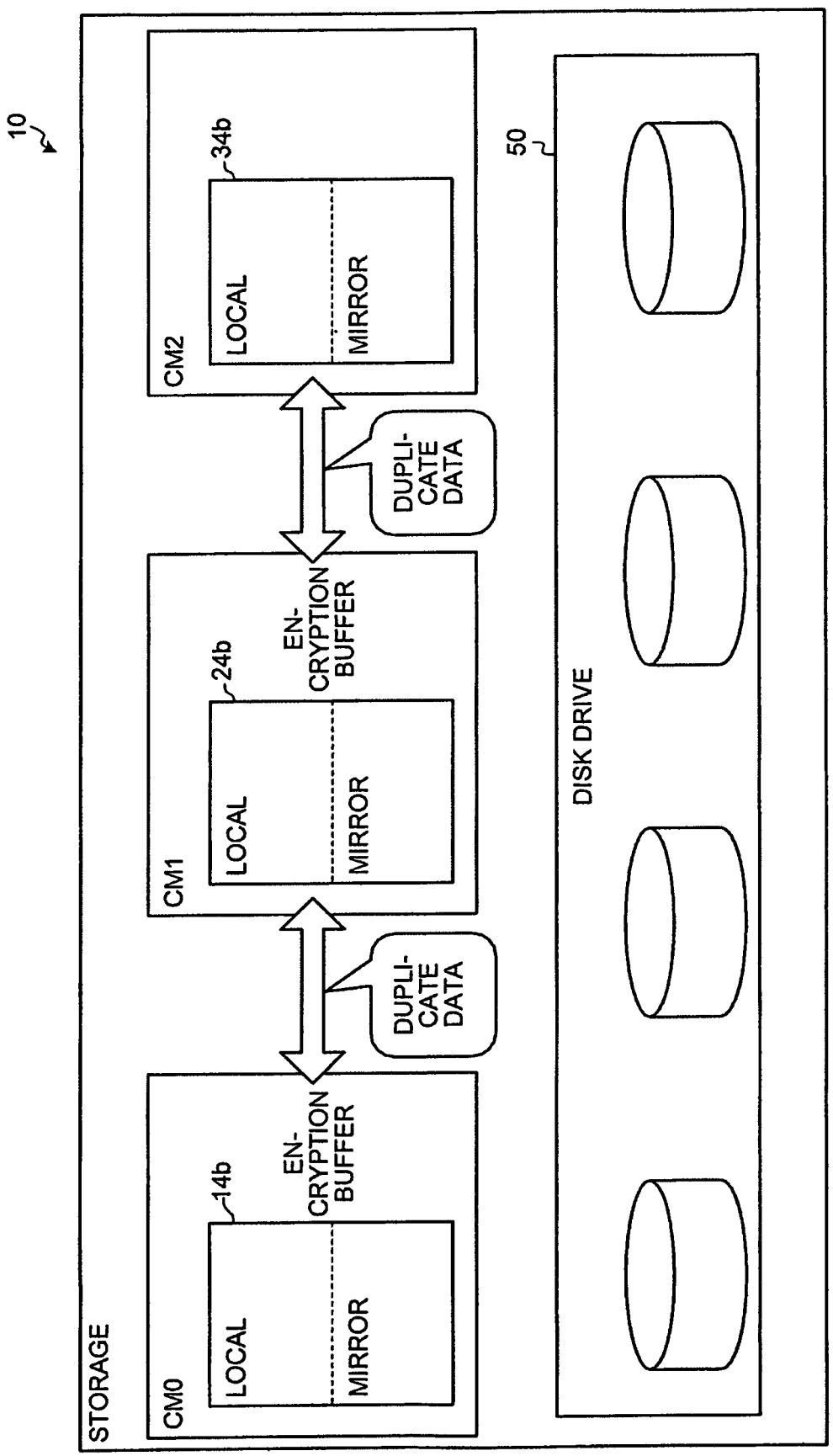
FIG. 14 is a schematic for explaining an encryption buffer of a storage according to a third embodiment of the present invention.

The storage 10 according to a third embodiment of the present invention is explained with reference to FIGS. 14 and 15 as an example in which the encryption buffer includes the local area and the mirror area. FIG. 14 is a schematic for explaining the encryption buffer of the storage 10 according to the third embodiment, and FIG. 15 is a flowchart for explaining a case when a failure occurs in the CM in the storage 10 according to the third embodiment.

In the storage 10 according to the third embodiment, as shown in FIG. 14, the encryption buffer in each CM includes the local area (Local) for storing the unencrypted data as the local data, and the mirror area (Mirror) for storing the unencrypted data as the mirror data corresponding to the local data stored in another encryption buffer. The storage 10 according to the third embodiment writes the local data in the encryption buffer of the CM in the local area, and instructs the encryption buffer to write the mirror data corresponding to the local data in a mirror area in the other encryption buffer of the other CM, to duplicate the unencrypted data. Specifically, a CM0 in the storage 10 according to the third embodiment writes local data in the local area of the encryption buffer 14b, and instructs to write the mirror data corresponding to the local data in the mirror area of the encryption buffer 24b in a CM1 to duplicate the unencrypted data.

Figure 15:
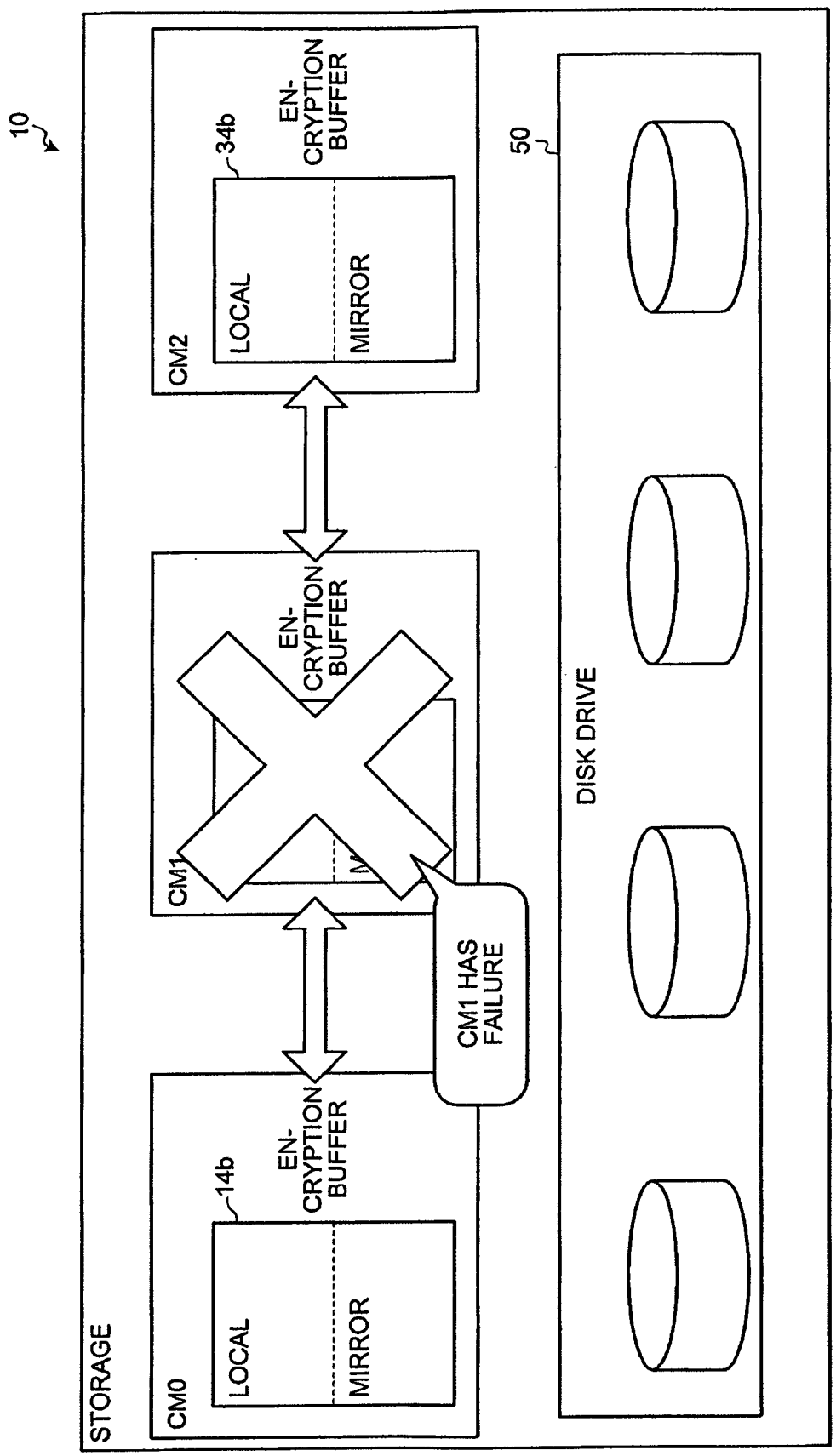
FIG. 15 is a schematic for explaining a case that a failure occurs in a controller module (CM) in the storage shown in FIG. 14.

As shown in FIG. 15, there is a case that a failure occurs in the CM in the storage 10 according to the third embodiment. In this case, since processing of the local data in the CM having the failure cannot be performed, the CM that has stored the mirror data corresponding to the local data (hereinafter, "mirror CM") needs to take over the processing. Further, since the mirror data in the CM having the failure has been lost and there is no mirror data corresponding to the local data, the data needs to be duplicated again. That is, with reference to FIG. 15, when the CM1 in the storage 10 according to the third embodiment has a failure, since the processing of the local data stored in the local area of the encryption buffer 24b in the CM1 cannot be performed, the CM2, which is a mirror CM of the CM1, needs to perform the processing by using the mirror data stored in the mirror area of an encryption buffer 34b. Furthermore, when the CM1 in the storage 10 according to the third embodiment has a failure, since there is no mirror data corresponding to the local data stored in the local area of the encryption buffer 14b in the CM0, the local data needs to be duplicated again in the mirror area of the encryption buffer 34b in the CM2.

Accordingly, when a failure occurs in the CM in the storage 10 according to the third embodiment, following processing is performed. Hereinafter, the processing for taking over the processing of the local data when a failure occurs or the processing for reduplicating the data is referred to as a recovery process and the data to be recovered is referred to as a recovery target.

A recovery process performed by the storage 10 according to the third embodiment is explained with reference to FIGS. 16 to 21.

Figure 16:
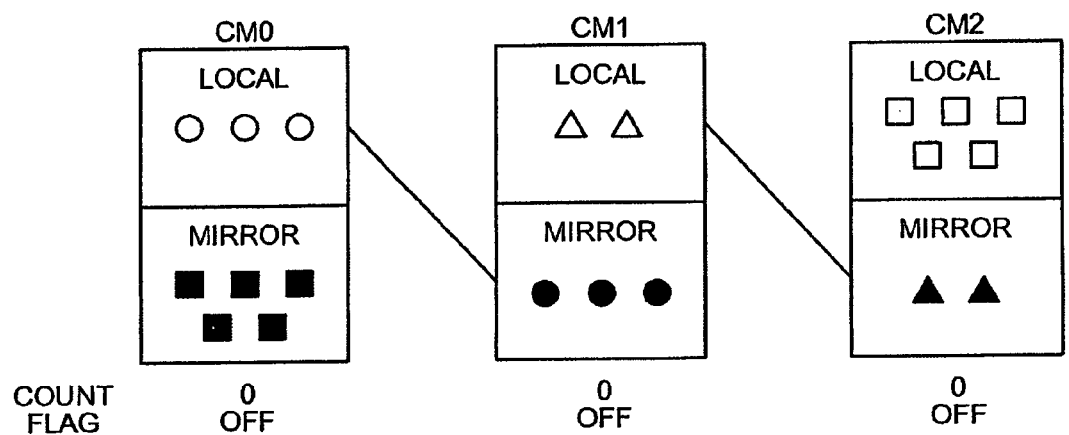
FIG. 16 is a schematic for explaining a recovery process performed by the storage shown in FIG. 14.

As shown in FIG. 16, the CM0 stores the local data in the local area, and the CM1 stores the mirror data corresponding to the local data in the mirror area. The CM1 stores the local data in the local area, and the CM2 stores the mirror data corresponding to the local data in the mirror area. The CM2 stores the local data in the local area, and the CM0 stores the mirror data corresponding to the local data in the mirror area. The storage includes a main controller (not shown) that manages all the CMs.

Figure 17:
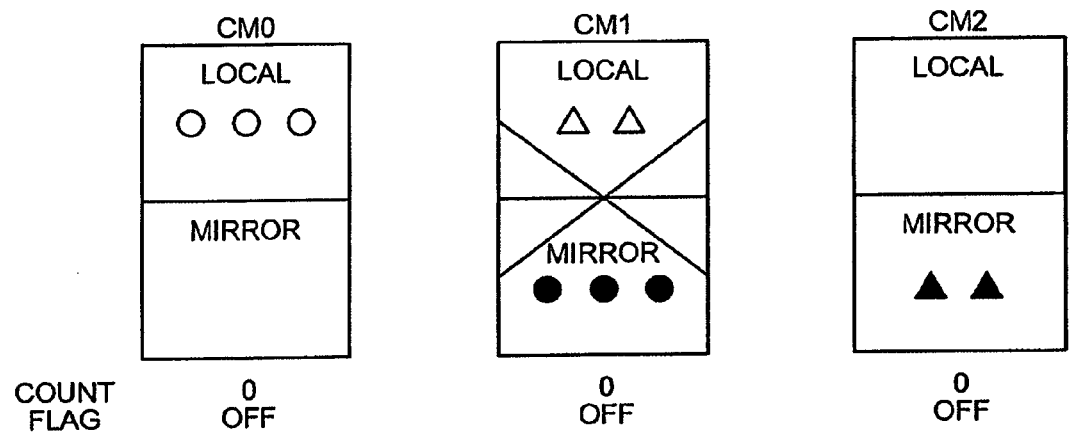
FIG. 17 is a schematic for explaining the recovery process performed by the storage shown in FIG. 14.

With this configuration, if a failure occurs in the CM1 in the storage 10 according to the third embodiment, as shown in FIG. 17, the main controller transmits a suspend notification for requesting suspension of the processing to the CM0 and the CM2. When progress information of the local data in the CM0 and the local data in the CM2 is phase=WRITE indicating that data is being written back on the disk drive 50, the storage 10 according to the third embodiment continuously writes back the local data in the CM0 and the local data in the CM2 on the disk drive 50, and continues the processing without suspending the processing until the progress information is updated. It is assumed that the storage 10 according to the third embodiment shown in FIG. 17 has completed write back of the local data in the CM2, however, the local data in the CM0 cannot be written back and remains.

Figure 18:
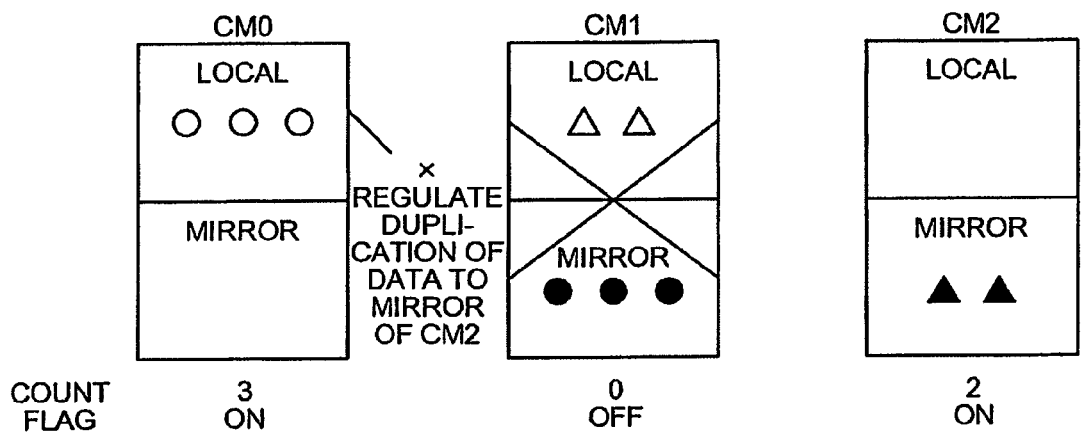
FIG. 18 is a schematic for explaining the recovery process performed by the storage shown in FIG. 14.

Subsequently, as shown in FIG. 18, since a failure occurs in the CM1 that stores therein the mirror data corresponding to the local data stored in the local area of the CM0 in the storage 10 according to the third embodiment, the CM0 issues an instruction to write the mirror data corresponding to the local data in the mirror area of the CM2, which does not have a failure. However, if the mirror data of the CM1 has been already stored in the mirror area of the CM2, duplication of the local data in the mirror area of the CM2 is made to wait.

Specifically, when the main controller in the storage 10 according to the third embodiment transmits a degrade notification for requesting preparation for resuming the processing to the CM0 and the CM2, the local data in the CM0 and the mirror data in the CM2, which are not duplicated and for which progress information is phase=WRITE, are designated as a recovery target. In other words, the storage 10 according to the third embodiment turns on a flag indicating that the data is the recovery target, and sets a counter indicating as to how many volumes the recovery is needed (for example, the counter of the CM0 is "3" and the counter of the CM2 is "2"). When the flag of the CM2, which keeps the reduplicated data of the local data of the CM0, is turned on, the storage 10 according to the third embodiment suspends reduplication of the CM0, since there is a possibility of destroying the mirror data of the CM2.

Figure 19:
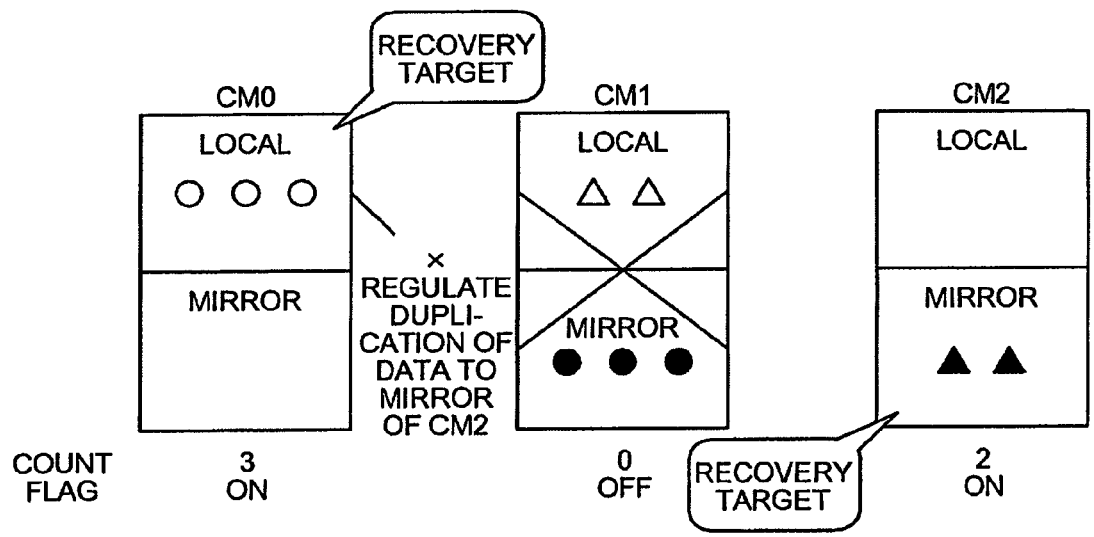
FIG. 19 is a schematic for explaining the recovery process performed by the storage shown in FIG. 14.

When there is a failure in the CM1 and mirror data corresponding to the local data stored in the CM1 is stored in the mirror area of the CM2, as shown in FIG. 19, the storage 10 according to the third embodiment designates the mirror data in the CM2 as a recovery target, and the CM2 takes over the processing from the CM1 by using the mirror data.

Specifically, in the storage 10 according to the third embodiment, the main controller transmits a resume notification for requesting resumption of the processing to the CM0 and the CM2. The CM2 takes over the processing of the mirror data from the CM1 as the recovery target, and others also resume processing as usual. The CM0 exclusively resumes the processing of the local data to be recovered, and other normal processing are not resumed, since the mirror data in the CM2, which is to be newly duplicated, cannot be used.

Figure 20:
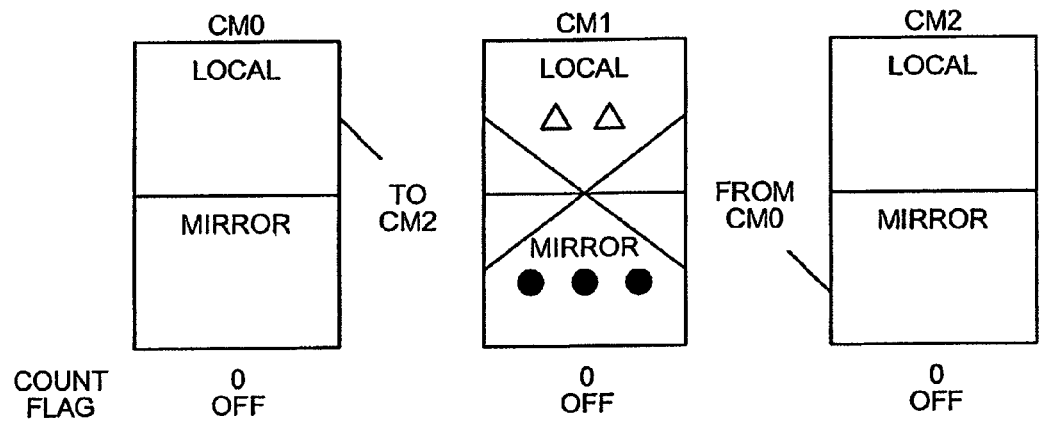
FIG. 20 is a schematic for explaining the recovery process performed by the storage shown in FIG. 14.

As shown in FIG. 20, when the data having been stored in the mirror area of the CM2 disappears, the storage 10 according to the third embodiment transmits information indicating that there is no data in the mirror area of the CM2 to the CM0. When the CM0 receives the information, the storage 10 according to the third embodiment writes the local data of the CM0 in the mirror area of the CM2.

Specifically, when the recovery process of the local data in the CM0 and the mirror data in the CM2 has finished, the storage 10 according to the third embodiment turns off the flags of the CM0 and the CM2, and decrements the counters thereof. In the storage 10 according to the third embodiment, when the counter number of the CM2 becomes zero, the main controller finishes the recovery process and transmits a recovery-complete notification indicating that there is no data in the mirror area of the CM2 to the CM0, so that the CM0 cancels the duplication-suspended state to resume the normal processing.

Figure 21:
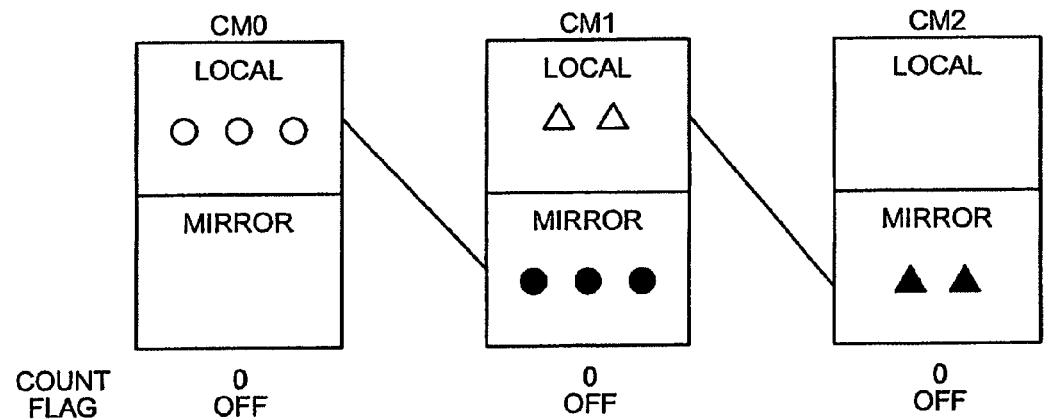
FIG. 21 is a schematic for explaining the recovery process performed by the storage shown in FIG. 14.

As shown in FIG. 21, when the CM1 having the failure is recovered, the main controller in the storage 10 according to the third embodiment transmits a certificate management protocol (CMP)-upgrade notification to the CM0 and the CM2. Each of the CMs resume the normal processing such that the local data in the CM0 is duplicated in the mirror area of the CM1, and the local data in the CM1 is duplicated in the mirror area of the CM2.

A forced storing process performed by the storage 10 according to the third embodiment is explained next with reference to FIG. 22.

Figure 22:
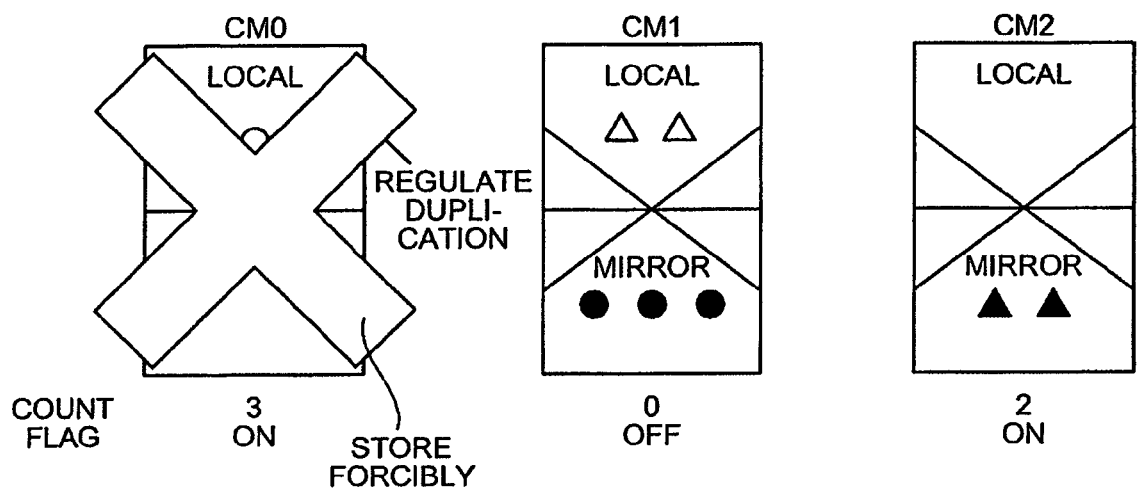
FIG. 22 is a schematic for explaining the recovery process performed by the storage shown in FIG. 14.

As shown in FIG. 22, when a failure occurs in the CM1 that stores therein the mirror data corresponding to the local data stored in the local area of the CM0, and a failure also occurs in the CM2, the storage 10 according to the third embodiment forcibly stores the data in the CM0, CM1, and CM2, and forcibly suspends the processing relating to the data in the CM0, CM1, and CM2.

The restoration process performed by the storage 10 according to the third embodiment is explained with reference to FIGS. 23 to 27.

Figure 23:
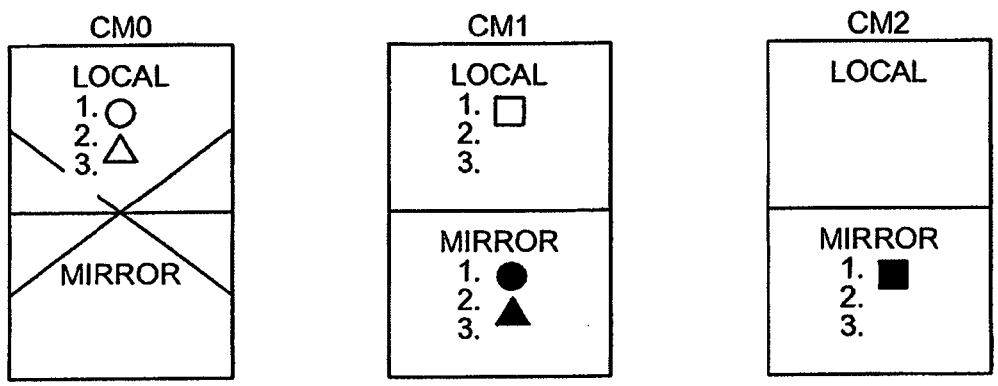
FIG. 23 is a schematic for explaining a restoration process performed by the storage shown in FIG. 14.

As shown in FIG. 23, when a failure occurs in the CM0, the storage 10 according to the third embodiment starts the recovery process of the mirror data in the CM1 as a recovery target.

Figure 24:
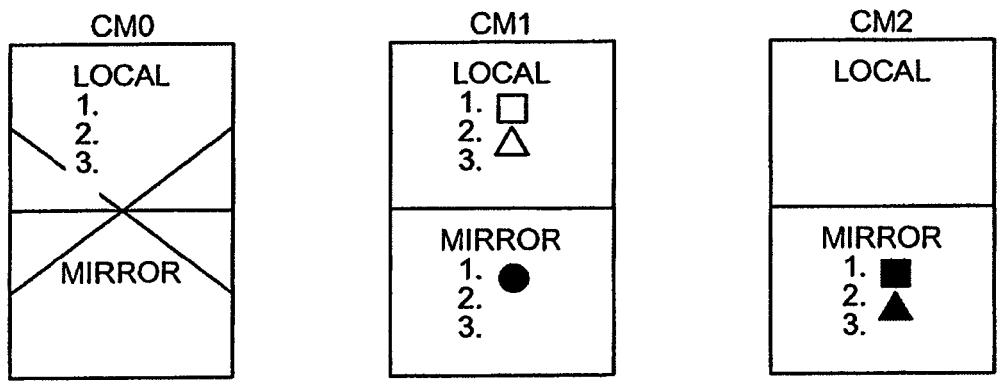
FIG. 24 is a schematic for explaining the restoration process performed by the storage shown in FIG. 14.

Subsequently, as shown in FIG. 24, the CM1 in the storage 10 according to the third embodiment reduplicates the mirror data (data indicated by black triangles in FIG. 23) in the mirror area of the CM2 as the recovery process, recovers the mirror data in the local area of the CM1, and performs the subsequent processing.

Figure 25:
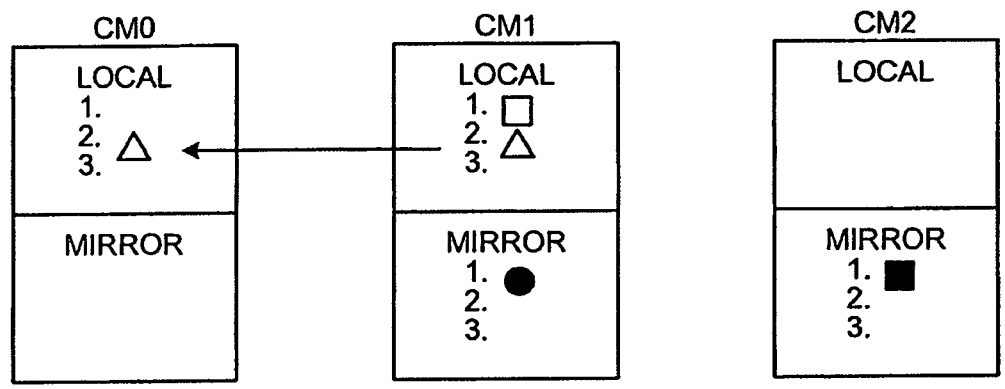
FIG. 25 is a schematic for explaining the restoration process performed by the storage shown in FIG. 14.

When the CM0 is restored as shown in FIG. 25, the CM1 issues an instruction to the CM0 to secure a local buffer for the local data (data indicated by white triangles in FIG. 24), which is the data originally to be stored in the CM0, and to write the local data stored in the local area of the CM1 in the local area of the CM0.

Figure 26:
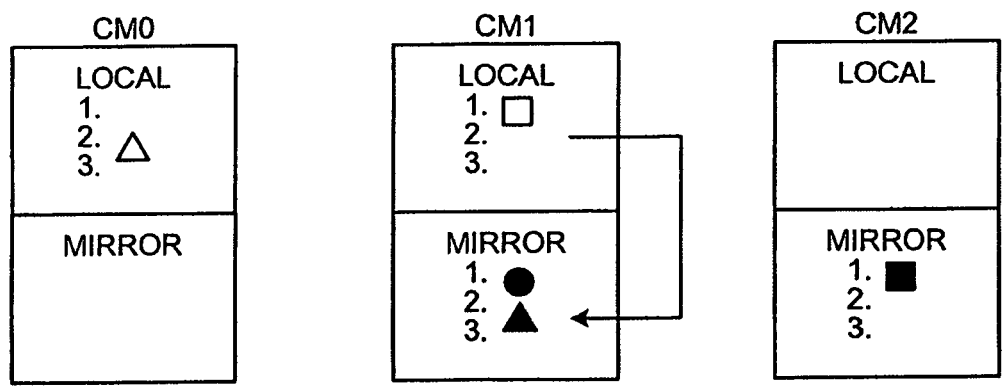
FIG. 26 is a schematic for explaining the restoration process performed by the storage shown in FIG. 14.

Since the mirror data corresponding to the local data (data indicated by white triangles in FIG. 25) needs to be stored in the mirror area of the CM1, the CM1 stores the mirror data in the mirror area, as shown in FIG. 26, when the CM1 holds the mirror data to be stored in the mirror area, in the own local area.

Figure 27:
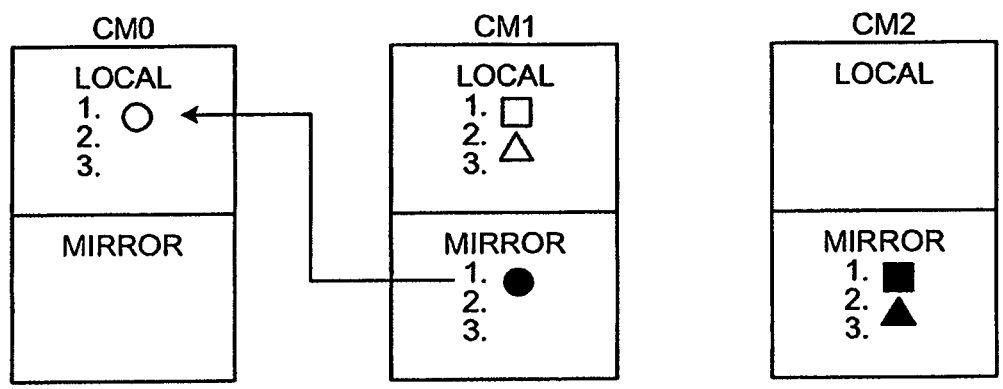
FIG. 27 is a schematic for explaining the restoration process performed by the storage shown in FIG. 14.

Furthermore, since the local data (data indicated by black circle in FIG. 26), which is the data originally to be stored in the CM0, needs to be stored in the CM0, and also in the CM1 as the mirror data, as shown in FIG. 27, the CM1 instructs the CM0 to write the mirror data stored in the mirror area of the CM1 in the local area of the CM0, and stores the mirror data as it is.

The encryption buffer 14b in the storage 10 according to the third embodiment includes the local area for storing the unencrypted data as the local data, and the mirror area for storing the unencrypted data as the mirror data corresponding to the local data stored by another encryption buffer 14b. The encryption buffer 14*b* writes the local data in the local area and instructs to write the mirror data corresponding to the local data in the mirror area of another encryption buffer 14*b*. When a failure occurs in another encryption buffer 14*b*, and the mirror data corresponding to the local data stored in the other encryption buffer 14*b* is stored in the mirror area of its own, the encryption buffer 14*b* encrypts the unencrypted data stored in the mirror area to predetermined encrypted data, and writes the encrypted data on the disk drive 50 instead of the other encryption buffer 14*b*. When a failure occurs in another encryption buffer 14*b*, and the mirror data corresponding to the local data stored in the other encryption buffer 14*b* is stored in the mirror area of its own, the encryption buffer 14*b* writes the encrypted data on the disk drive 50 instead of the other encryption buffer 14*b*. When a failure occurs in another encryption buffer 14*b*, and the mirror data corresponding to the local data stored in the other encryption buffer 14*b* is stored in the mirror area of its own, the encryption buffer 14*b* converts the unencrypted data stored in the mirror area to different encrypted data and writes the encrypted data on the disk drive 50 instead of the other encryption buffer 14*b*. As a result, even when there is a failure in other encryption buffers 14*b*, the encrypting process, the decrypting process, and the re-encrypting process can be performed by using the mirror data corresponding to the local data in another encryption buffer 14*b*.

According to the third embodiment, when a failure occurs in another encryption buffer 14*b* that stores therein the mirror data corresponding to the local data stored in the local area of its own, the encryption buffer 14*b* instructs another encryption buffer 14*b* having no failure to write the mirror data corresponding to the local data in the mirror area of the other encryption buffer 14*b*. As a result, the unencrypted data can be reduplicated even when there is a failure in the mirror buffer.

Furthermore, according to the third embodiment, when data is already stored in the mirror area of another encryption buffer 14*b*, write of the unencrypted data in the mirror area of the other encryption buffer is made to wait. As a result, overwrite of data already stored in the mirror area of another encryption buffer 14*b* can be prevented.

Moreover, according to the third embodiment, when the data having been stored in the mirror area of another encryption buffer 14*b* disappears, the storage transmits storage status information indicating that there is no data in the mirror area of the other encryption buffer 14*b*. When the other encryption buffer 14*b* receives the storage status information, the other encryption buffer 14*b* writes the unencrypted data in the mirror area of the other encryption buffer 14*b*. As a result, when there is not any data having been stored in the mirror area, the unencrypted data can be reduplicated.

Furthermore, according to the third embodiment, when a failure occurs in the encryption buffer 14*b* that stores the mirror data corresponding to the local data stored in the own local area, and a failure also occurs in another encryption buffer 14*b*, the processing relating to the unencrypted data is suspended, while the unencrypted data stored in the encryption buffer 14*b* is retained. Therefore, the stored data can be forcibly retained so as not to lose the stored data.

Moreover, according to the third embodiment, when another encryption buffer 14*b* that stores therein the local data corresponding to the mirror data stored in the own mirror area is restored, the encryption buffer 14*b* instructs to write the mirror data stored in the own mirror area in the local area of the other encryption buffer 14*b*. Therefore, the state can be returned to the original state before the occurrence of the failure.

Furthermore, according to the third embodiment, when the unencrypted data to be stored in the mirror area is held in the own local area, the unencrypted data is stored in the mirror area. As a result, processing speed can be increased by omitting communication between different modules.

While the first to third embodiments of the present invention have been explained above, the present invention can also embrace various different embodiments other than the above embodiments. A fourth embodiment of the present invention is explained below as one of the other embodiments embraced in the invention.

The respective constituent elements of the units shown in the accompanying drawings are functionally conceptual, and physically the same configuration is not always necessary. In other words, the specific mode of distribution and integration of the units is not limited to the shown ones, and all or a part thereof can be functionally or physically distributed or integrated in an optional unit, according to the various kinds of load and the status of use. For example, the encrypting unit 13*a*, the decrypting unit 13*b*, and the re-encrypting unit 13*c* can be integrated. All or an optional part of the various process functions performed by each unit can be realized by a central processing unit (CPU) or a program analyzed and executed by the CPU, or can be realized as hardware by a wired logic.

Figure 28:
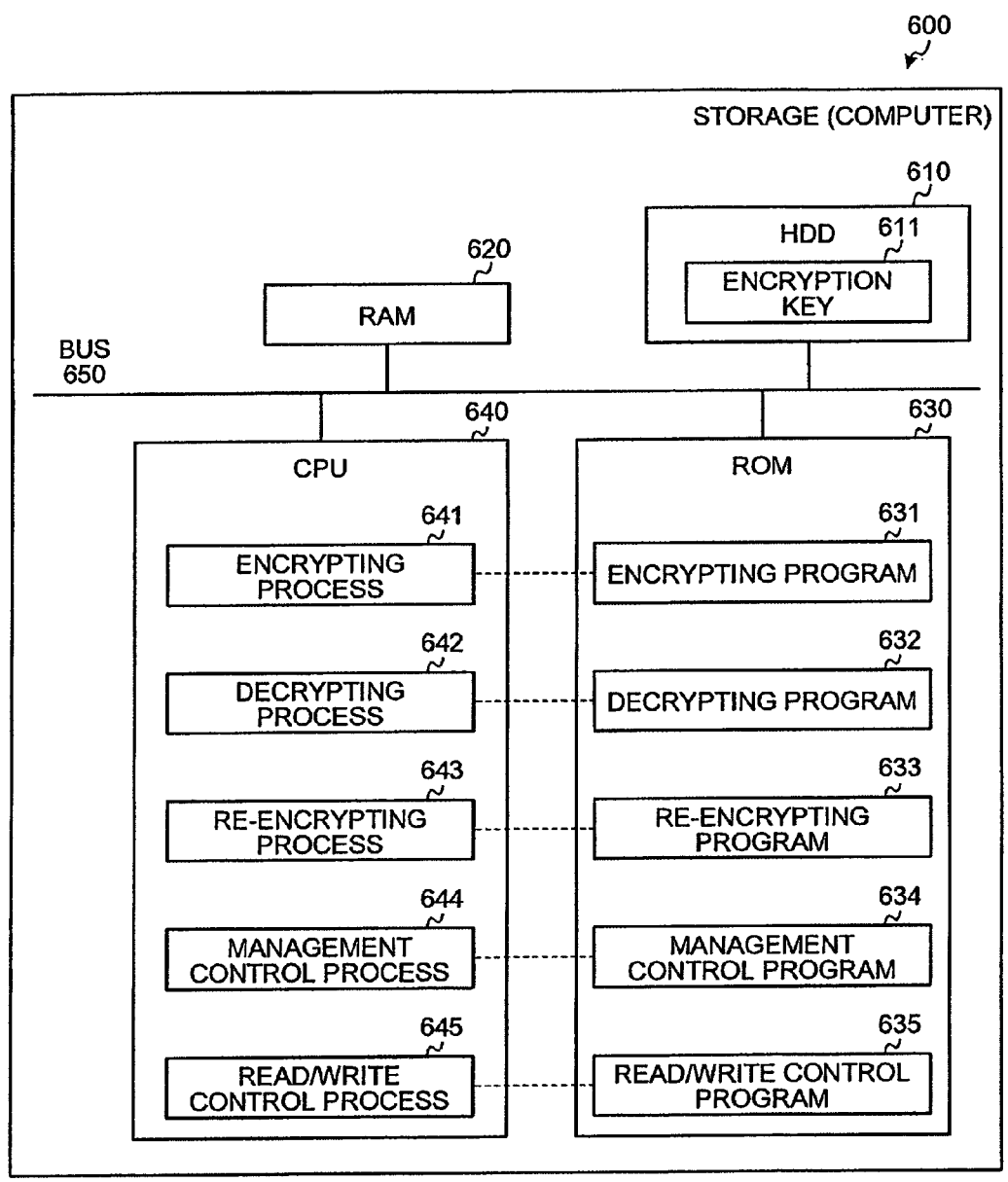
FIG. 28 is a block diagram of a computer that executes an encrypting program according to a fourth embodiment of the present invention.

Various types of processing explained in the above embodiments can be realized by executing a program prepared beforehand by a computer. An example of the computer that executes the program including the same functions as those of the above embodiments is explained with reference to FIG. 28. FIG. 28 depicts the computer that executes an encrypting program.

As shown in FIG. 28, a computer 600 as a storage is configured by connecting a hard disk drive (HDD) 610, a random access memory (RAM) 620, a read only memory (ROM) 630, and a CPU 640 via a bus 650.

In the ROM 630, as shown in FIG. 28, a storage that demonstrates the same functions as those of the above embodiments, that is, an encrypting program 631, a decrypting program 632, a re-encrypting program 633, a management control program 634, and a read/write control program 635 are pre-stored. The programs 631 to 635 can be appropriately combined or distributed, like the respective components in the storage shown in FIG. 28.

Since the CPU 640 reads these programs 631 to 635 from the ROM 630 to execute these programs, as shown in FIG. 28, the program 631 function as an encrypting process 641, the program 632 as a decrypting process 642, the program 633 as a re-encrypting process 643, the program 634 as a management control process 644, and the program 635 as a read/write control process 645. The process 641 corresponds to the encrypting unit 13*a*, the process 642 to the decrypting unit 13*b*, the process 643 to the re-encrypting unit 13*c*, the process 644 to the management controller 13*d*, and the process 645 to the read/write controller 13*e*.

As shown in FIG. 28, the HDD 610 stores therein an encryption key (decryption key) 611 used for encrypting or decrypting the data.

Although a static encryption key and a static encryption system are explained in the first to the fourth embodiments, it is possible to dynamically change the encryption key and the encryption system. Such a storage is described below as a fifth embodiment of the present invention with reference to FIGS. 29 to 34.

Figure 29:
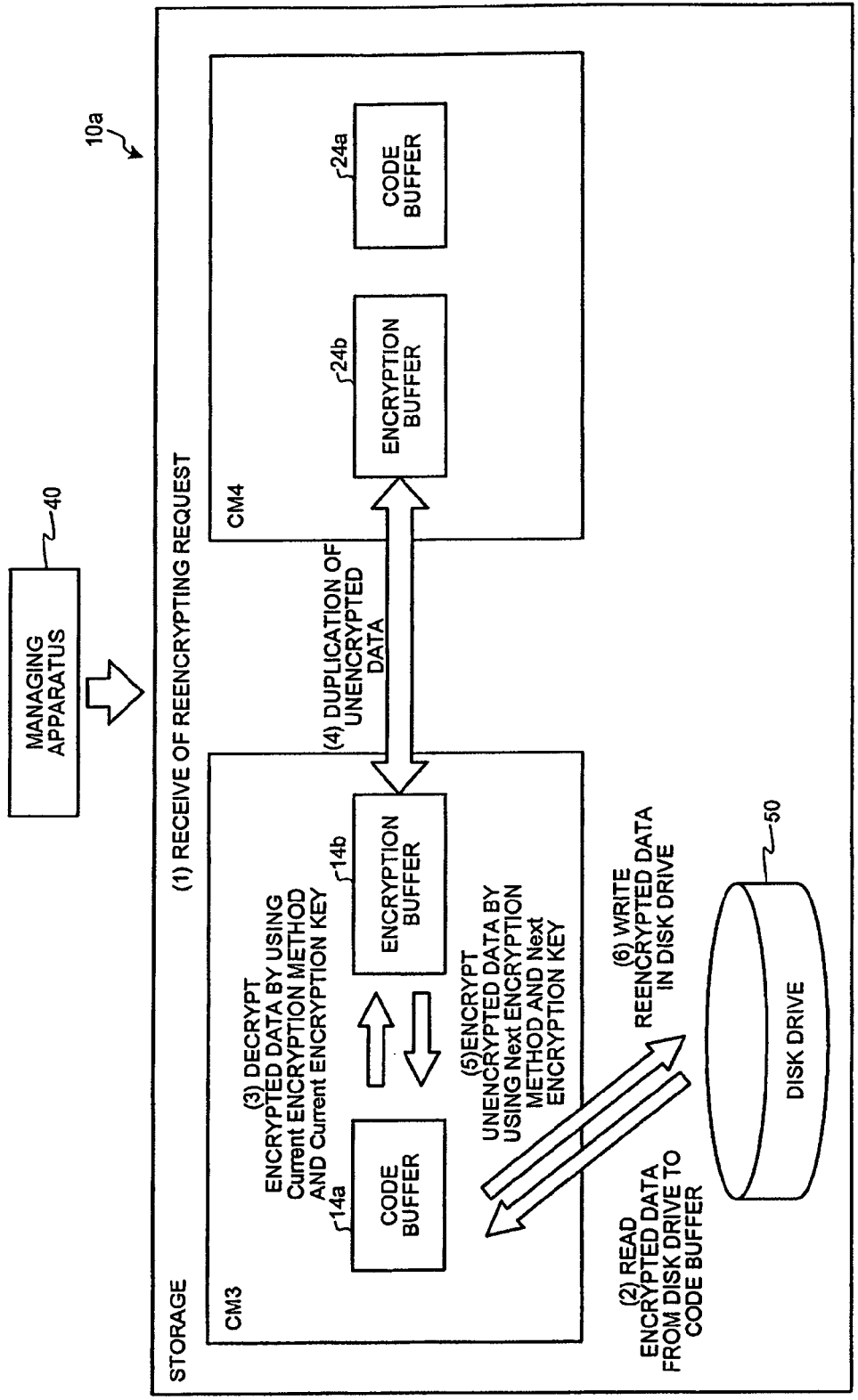
FIG. 29 is a schematic for explaining an outline and characteristics of a storage according to a fifth embodiment of the present invention.
Figure 30:
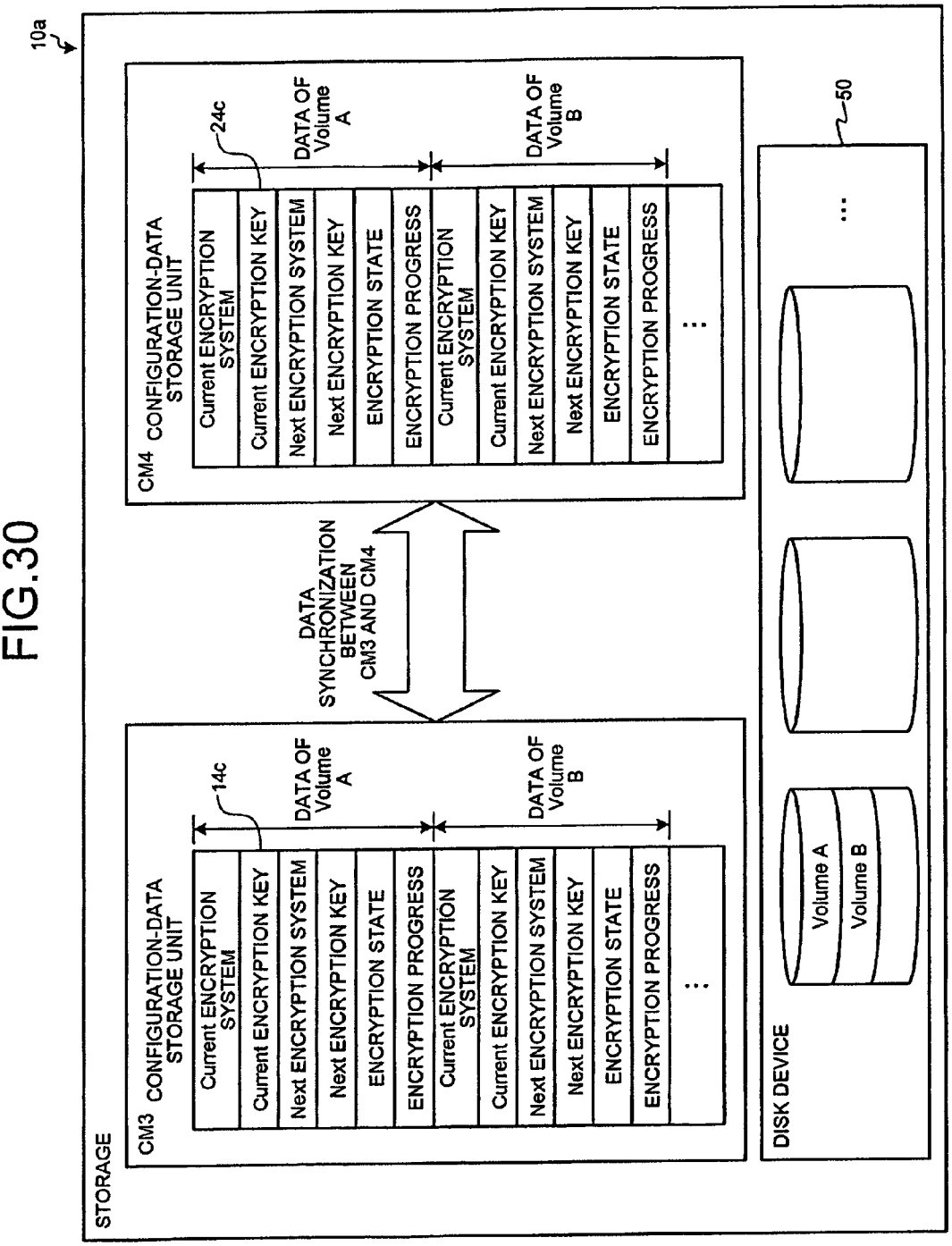
FIG. 30 is a schematic for explaining configuration data stored in the storage shown in FIG. 29.

FIG. 29 is a schematic for explaining an outline and characteristics of a storage 10*a* according to the fifth embodiment. The storage 10*a* is different from the storage 10 in the first embodiment in that the storage 10a includes, as shown in FIG. 30, a CM3 and CM4 instead of the CM0 and the CM1 in the first embodiment. The CM3 includes a configuration-data storage unit 14c and the CM4 includes a configuration-data storage unit 24c. The configuration-data storage unit 14c stores therein a current encryption system, a current encryption key, a next encryption system, and a next encryption key. The current encryption system and the current encryption key are the ones that are being currently used, while the next encryption system and the next encryption key are the ones that will be used after encryption using the current encryption key and the current encryption system is over.

Upon receiving a reencrypting request for a predetermined volume from the managing apparatus 40 (see (1) in FIG. 29), the storage 10a starts reading of the encrypted data in the predetermined volume from the disk drive 50 to the encryption buffer 14b (see (2) in FIG. 29).

The storage 10a decrypts the encrypted data stored in the code buffer 14a by using the current encryption system and the current encryption key thereby obtaining unencrypted data (see (3) in FIG. 29), and makes the unencrypted data redundant by duplicating the unencrypted data (see (4) in FIG. 29).

The storage 10a then encrypts the unencrypted data by using the next encryption system and the next encryption key thereby obtaining reencrypted data (see (5) in FIG. 29), and writes the reencrypted data in the disk drive 50 (see (6) in FIG. 29).

Specifically, the storage 10a sets an encryption key to be used for encryption performed after encryption using the current encryption key has been finished as the "next encryption key" in the configuration-data storage unit 14c, encrypts the unencrypted data by using the next encryption system and the next encryption key, and writes the reencrypted data in the disk drive 50.

The storage 10a then updates data on the encryption system that has been set as the "next encryption system" to be set as the "current encryption system" in the configuration-data storage unit 14c. Similarly, the storage 10a updates data on the encryption key that has been set as the "next encryption key" to be set as the "current encryption key" in the configuration-data storage unit 14c. In other words, after the unencrypted data is encrypted by using the next encryption system and the next encryption key, the storage 10a updates previously set current encryption system and current encryption key with the next encryption system and the next encryption key for a corresponding volume in the configuration-data storage unit 14c.

As described above, the storage 10a dynamically changes the encryption system and the encryption key, so that it is possible to easily change the encryption system and the encryption key if a security hole may be detected in the storage 10a, or the encryption key may be leaked to unauthorized people. As a result, strong security can be maintained.

As shown in FIG. 30, each of the configuration-data storage units 14c, 24c stores therein items such as current encryption system, current encryption key, next encryption system, next encryption key, encryption status, and encryption progress. The current encryption system and the current encryption key are the ones that currently in use for encrypted data in each volume. The next encryption system and the next encryption key are the one that are to be used for encryption performed after encryption using the current encryption system and the current encryption key has been finished. The encryption status indicates whether an encryption request for each volume has been received. The encryption progress indicates which data is being encrypted in each volume.

Figure 31:
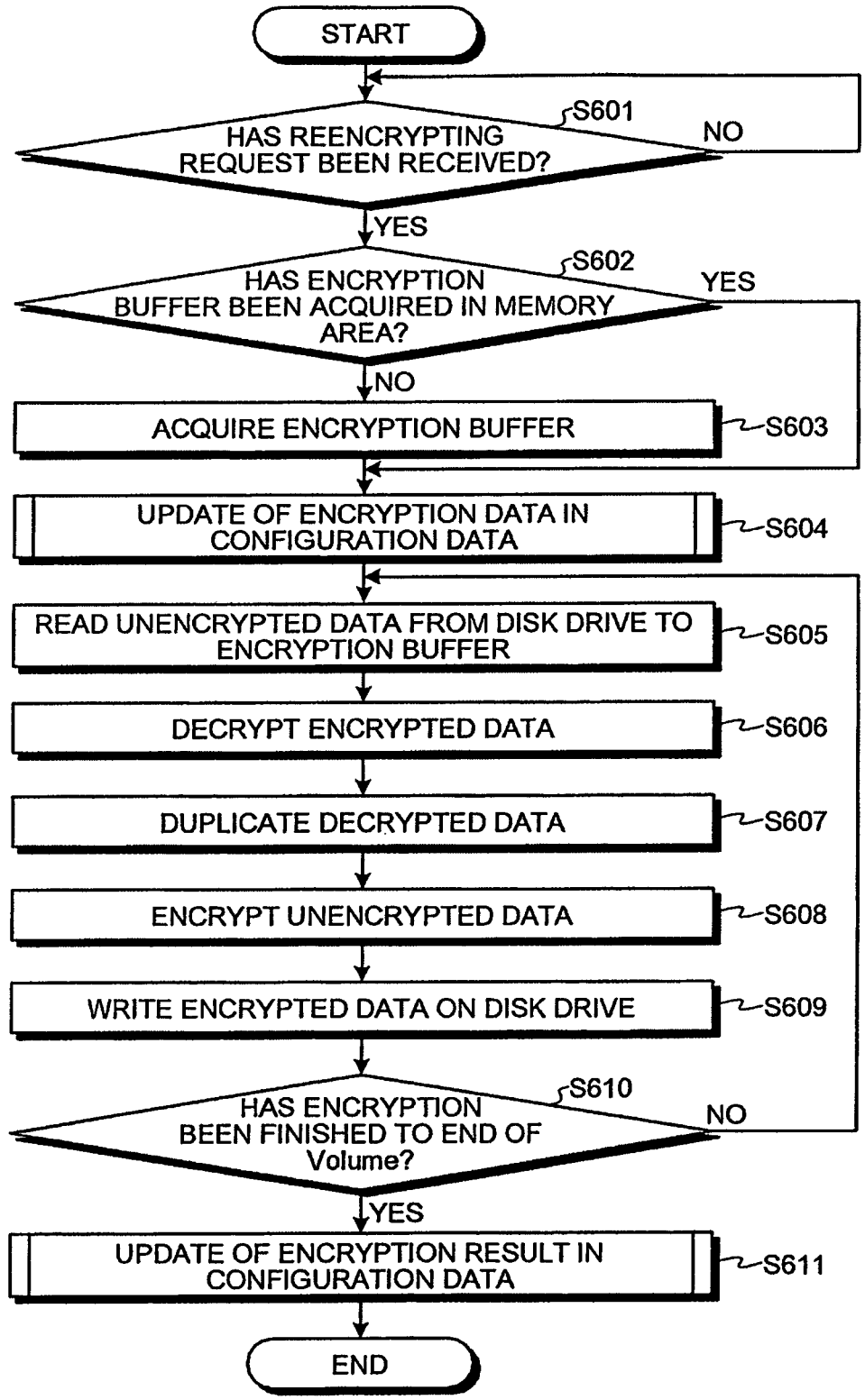
FIG. 31 is a flowchart of a reencrypting process performed by the storage shown in FIG. 29.

FIG. 31 is a flowchart of a reencrypting process performed by the storage 10a. Upon receiving a request for reencrypting data for a predetermined volume from the managing apparatus 40 (YES at step S601), the storage 10a determines whether the code buffer 14a has been acquired in the memory area (step S602). If the code buffer 14a has not been acquired (NO at step S602), the storage 10a acquires the code buffer 14a in the memory area (step S603).

If the code buffer 14a has been acquired in the memory area (YES at step S602), the storage 10a performs a process of updating an encryption data in the configuration data, which is to be described in detail with reference to FIG. 32 (step S604). The storage 10a then starts reading the encrypted data in the predetermined volume from the disk drive 50 to the code buffer 14a (step S605).

The storage 10a decrypts the encrypted data to obtain the unencrypted data by using the current encryption system and the current encryption key (step S606), duplicates the unencrypted data in the encryption buffer 14b (step S607), and encrypts the duplicated unencrypted data to an encrypted data different from the encrypted data that has been decrypted at step S606 (step S608).

The storage 10a then writes the encrypted data on the disk drive 50 (step S609), and determines whether encryption has finished to the end of the volume (step S610). As a result of the determination, if the encryption has not finished to the end of the volume (NO at step S610), the storage 10a reads the unencrypted data to the encryption buffer 14b (step S605), and repeats the encrypting process. When the encryption has finished to the end of the volume (YES at step S610), the storage 10a performs a process of updating an encryption result, which is to be described in detail with reference to FIG. 33 (step S611), and finishes the process.

Figure 32:
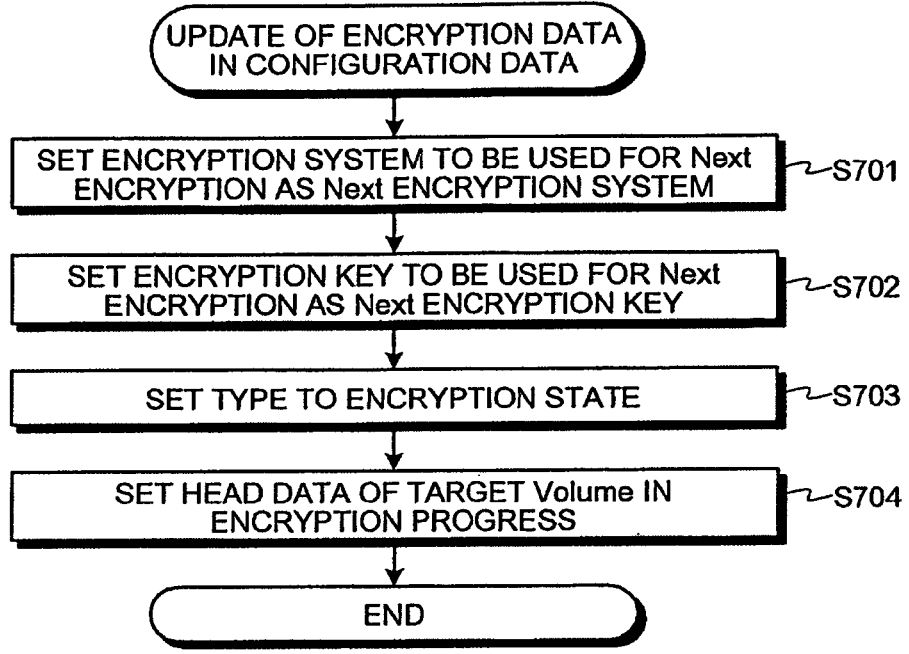
FIG. 32 is a flowchart of a process of updating encryption data performed by the storage shown in FIG. 29.

FIG. 32 is a flowchart of a process of updating encryption data performed by the storage 10a.

When the code buffer 14a has been acquired in the memory area (YES at step S602), or after the code buffer 14a is acquired in the memory area (step S603), the storage 10a sets an encryption system to be used for next encryption performed after encryption using the current encryption system and the current encryption key has been finished as "next encryption system" in the configuration-data storage unit 14c (step S701).

The storage 10a then sets an encryption key to be used for next encryption as "next encryption key" in the configuration-data storage unit 14c (step S702), and sets a status of an encryption process in "encryption status" in the configuration-data storage unit 14c (step S703). Specifically, the storage 10a updates a specified encryption data to be set as "next encryption system", "next encryption key", and "encryption status" when receiving the reencrypting request from the managing apparatus 40. The storage 10a then sets a head data in a target volume to "encryption progress" in the configuration-data storage unit 14c (step S704), and process control ends.

Figure 33:
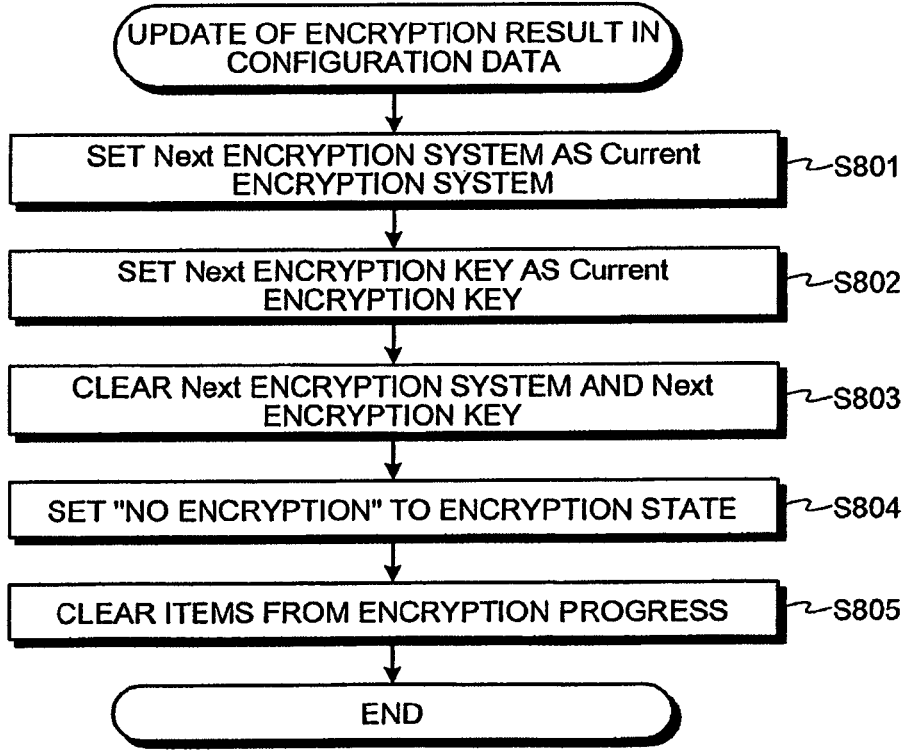
FIG. 33 is a flowchart of a process of updating an encryption result performed by the storage shown in FIG. 29.

FIG. 33 is a flowchart of a process of updating an encryption result performed by the storage 10a. When it is determined that the encryption has finished to the end of the volume (YES at step S610), the storage 10a updates data on the encryption system that has been set as the "next encryption system" to be set as the "current encryption system" (step S801). Similarly, the storage 10a updates data on the encryption key that has been set as the "next encryption key" to be set as the "current encryption key" (step S802).

The storage 10a clears the encryption system and the encryption key previously set as the "next encryption system" and the "next encryption key" in the configuration-data storage unit 14c (step S803), and sets data indicative of "no encryption" in the "encryption status" in the configuration-data storage unit 14c (step S804). The storage 10a then clears items from the "encryption progress" in the configuration-data storage unit 14c (step S805), and process control ends.

FIG. 34 is a flowchart of a read/write control process performed by the storage 10a. Upon reception of a host I/O request (YES at step S901), the storage 10a determines whether the volume requested by the host I/O request is being reencrypted (step S902). As a result of the determination, when the volume requested by the host I/O request is not being reencrypted (NO at step S902), the storage 10a accesses the disk drive 50 (step S912). If the volume requested by the host I/O request is encrypted data, the storage 10a decrypts that encrypted data in the volume by using the current encryption system and the current encryption key. On the other hand, if the volume requested by the host I/O request is unencrypted data, the storage 10a does not decrypt the unencrypted data (step S913), and performs a process requested by the host I/O request (step S909).

When the volume requested by the host I/O request is being reencrypted (YES at step S902), the storage 10a determines whether the host I/O request is for an area currently being reencrypted (step S903). When the host I/O request is for the area currently being reencrypted (YES at step S903), the storage 10a performs exclusive processing for waiting until the reencryption is completed (step S904). Then, the storage 10a determines whether the host I/O request spans over reencrypted data and pre-reencrypted data in the progressing area (step S905). On the other hand, when the host I/O request is not for the area currently being reencrypted (NO at step S903), the storage 10a determines whether the host I/O request spans over the reencrypted data and the pre-reencrypted data in a requested area (step S905), without performing the exclusive processing.

When the host I/O request does not span over the encrypted data and the pre-reencrypted data in a requested area (NO at step S905), the storage 10a accesses the disk drive 50 (step S910). If data requested by the host I/O request is in the pre-encrypted area, the storage 10a decrypts the pre-encrypted data by using the current encryption system and the current encryption key (step S911). If data requested by the host I/O request is in the reencrypted area, the storage 10a decrypts the reencrypted data by using the next encryption system and the next encryption key (step S911). Then, the storage 10a performs a process requested by the host I/O request (step S909).

On the other hand, when the host I/O request spans over the reencrypted data and the pre-reencrypted data in the requested area (YES at step S905), the storage 10a divides the reencrypted data and the pre-reencrypted data, and accesses the disk drive for each of the reencrypted data and the pre-reencrypted data (step s906). The storage 10a then decrypts data in the pre-reencrypted area by using the current encryption system and the current encryption key, while if data requested by the host I/O request is in the reencrypted area, the storage 10a decrypts the encrypted data by using the next encryption system and the next encryption key (step S907). The storage 10a combines the reencrypted data with the pre-reencrypted data (step S908), and performs the processing requested by the host I/O request (step S909).

As described above, according to the fifth embodiment, it is possible to dynamically change the encryption system and the encryption key. Therefore, it is possible to easily change the encryption system and the encryption key when any security holes are detected in relation to the storage 10a or the encryption key is leaked to unauthorized people. As a result, strong security can be maintained.

According to an aspect of the present invention, the data is encrypted and decrypted in the storage without being read out to the outside of the storage. Therefore, time for encrypting and decrypting the data can be reduced.

According to another aspect of the present invention, the unencrypted data can be converted to encrypted data, encrypted data can be converted to unencrypted data, and encrypted data can be converted to different encrypted data. Furthermore, data loss due to redundancy can be prevented.

According to still another aspect of the present invention, read/write control based on the read/write request can be performed according to the progress of data being encrypted or decrypted.

According to still another aspect of the present invention, the data is divided into encrypted data and unencrypted data, and the time required for performing the read/write control can be reduced, without waiting for completion of decrypting for the already encrypted data.

According to still another aspect of the present invention, the encrypted data is decrypted to unencrypted data concurrently, without waiting for the data currently being decrypted. Therefore, the time for performing the read/write control can be reduced.

According to still another aspect of the present invention, the data stored in the encryption buffer does not need to be read from the disk drive. Therefore, time for performing the read/write control can be reduced.

According to still another aspect of the present invention, even if a failure occurs in another encryption buffer, encrypting, decrypting, and re-encrypting can be continued by using the mirror data corresponding to the local data in the other encryption buffer.

According to still another aspect of the present invention, even if a failure occurs in a mirror buffer, the unencrypted data can be reduplicated.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A code conversion apparatus that is included in a storage and that encrypts and decrypts data stored in a disk drive in the storage that manages the data, the code conversion apparatus comprising:
   an encrypted-data storage unit that stores, in a code buffer in the storage, first encrypted data present in the disk drive, the encryption buffer being divided into a local area for storing therein unencrypted data as first local data and a mirror area for storing therein unencrypted data as first mirror data corresponding to second local data stored in a different encryption buffer;
   an unencrypted-data storage unit that stores, in an encryption buffer in the storage, first unencrypted data present in the disk drive;
   an encrypting unit that encrypts the first unencrypted data present in the encryption buffer to predetermined encrypted data;
   a decrypting unit that decrypts the first encrypted data present in the code buffer to second unencrypted data;
   a re-encrypting unit that decrypts the first encrypted data present in the code buffer to third unencrypted data and encrypts the third unencrypted data to second encrypted data different from the first encrypted data;
a monitoring unit that monitors a progress of data including monitoring whether data is at least one of being encrypted and decrypted by any one of the encrypting unit, the decrypting unit, and the re-encrypting unit; and
a read/write controlling unit that includes controlling read/write of data based on a read/write request based on the progress monitored by the monitoring unit, upon reception of the read/write request for requesting the disk drive to read and write data when the data is being encrypted and decrypted by any one of the encrypting unit, the decrypting unit, and the re-encrypting unit, wherein
the read/write controlling unit includes, upon reception of the read/write request for requesting read of target data including data currently being decrypted, waiting completion of decryption of the data, dividing the target data into fourth encrypted data and sixth unencrypted data after the decryption of the data is completed, reading the fourth encrypted data and the sixth unencrypted data, decrypting the fourth encrypted data to seventh unencrypted data, combining the sixth unencrypted data and the seventh unencrypted data, and controlling reading of the combined data,
the read/write controlling unit issues an instruction to write the first local data in the local area in a first encryption buffer and writes second mirror data corresponding to the first local data in a mirror area of a second encryption buffer,
the encrypting unit, when a failure occurs in the first encryption buffer and the second mirror data corresponding to the first local data stored in the first encryption buffer is stored in the mirror area of the second encryption buffer, decrypts the second mirror data to the predetermined encrypted data and writes the predetermined encrypted data to the disk drive,
the decrypting unit, when a failure occurs in the first encryption buffer and the second mirror data corresponding to the first local data stored in the first encryption buffer is stored in the mirror area of the second encryption buffer, writes the second mirror data to the disk drive, and
the re-encrypting unit, when a failure occurs in the first encryption buffer and the second mirror data corresponding to the first local data stored in the first encryption buffer is stored in the mirror area of the second encryption buffer, encrypts the second mirror data to different encrypted data and writes the different encrypted data to the disk drive.

2. A method for encrypting and decrypting data stored in a disk drive in a storage that manages the data, the method comprising:
dividing the encryption buffer into a local area for storing therein unencrypted data as first local data and a mirror area for storing therein unencrypted data as first mirror data corresponding to second local data stored in a different encryption buffer;
encrypted-data storing including storing a first encrypted data present in the disk drive, in a code buffer in the storage;
unencrypted-data storing including storing first unencrypted data present in the disk drive, in the encryption buffer in the storage;
encrypting the first unencrypted data present in the encryption buffer to predetermined encrypted data;
decrypting the first encrypted data present in the code buffer to second unencrypted data;
re-encrypting including decrypting the first encrypted data present in the code buffer to third unencrypted data and encrypting the third unencrypted data to second encrypted data different from the first encrypted data;
monitoring progress of data including monitoring whether data is at least one of being encrypted and decrypted at any one of the encrypting, decrypting, and the re-encrypting; and
read/write controlling including controlling read/write of data based on a read/write request based on the progress monitored at the monitoring, upon reception of the read/write request for requesting the disk drive to read and write data when the data is being encrypted and decrypted at any one of the encrypting, decrypting, and the re-encrypting, wherein
the read/write controlling includes, upon reception of the read/write request for requesting read of target data including data currently being decrypted, waiting completion of decryption of the data, dividing the target data into fourth encrypted data and sixth unencrypted data after the decryption of the data is completed, reading the fourth encrypted data and the sixth unencrypted data, decrypting the fourth encrypted data to seventh unencrypted data, combining the sixth unencrypted data and the seventh unencrypted data, and controlling reading of the combined data,
the read/write controlling includes issuing an instruction to write the first local data in the local area in a first encryption buffer and writing second mirror data corresponding to the first local data in a mirror area of a second encryption buffer,
the encrypting includes, when a failure occurs in the first encryption buffer and the second mirror data corresponding to the first local data stored in the first encryption buffer is stored in the mirror area of the second encryption buffer, decrypting the second mirror data to the predetermined encrypted data and writing the predetermined encrypted data to the disk drive,
the decrypting includes, when a failure occurs in the first encryption buffer and the second mirror data corresponding to the first local data stored in the first encryption buffer is stored in the mirror area of the second encryption buffer, writing the second mirror data to the disk drive, and
the re-encrypting includes, when a failure occurs in the first encryption buffer and the second mirror data corresponding to the first local data stored in the first encryption buffer is stored in the mirror area of the second encryption buffer, encrypting the second mirror data to different encrypted data and writing the different encrypted data to the disk drive.

3. The method according to claim 2, wherein
the encrypting includes duplicating the first unencrypted data in the encryption buffer, encrypting the first unencrypted data to the predetermined encrypted data, and writing the predetermined encrypted data to the disk drive,
the decrypting includes decrypting the first encrypted data to the fourth unencrypted data, duplicating the fourth unencrypted data in the code buffer, and writing the fourth unencrypted data to the disk drive, and
the re-encrypting includes decrypting the first encrypted to fifth unencrypted data, duplicating the fifth unencrypted data in the code buffer, encrypting the fifth unencrypted data to third encrypted data different from the first encrypted data, and writing the third encrypted data to the disk drive.

4. The method according to claim 2, wherein the read/write controlling includes, upon reception of the read/write request for requesting read of target data including data currently being decrypted, dividing the target data into eighth unencrypted data, first data currently being decrypted, and fifth encrypted data, decrypting the first data to ninth unencrypted data and the fifth encrypted data to tenth unencrypted data, combining the eighth to the tenth unencrypted data with one another, and controlling reading of the combined data.

5. The method according to claim 2, wherein the read/write controlling includes, upon reception of the read/write request for requesting read of target data including first data currently being decrypted, controlling reading of unencrypted data from the encryption buffer after decryption of the first data is completed and the first data is stored in the encryption buffer.

6. The method according to claim 2, wherein the write controlling includes, when a failure occurs in the second encryption buffer that stores therein the second mirror data corresponding to the first local data stored in the local area of the first encryption buffer, issuing an instruction to write the second mirror data corresponding to the first local data in a mirror area of a third encryption buffer that has no failure therein.

7. The method according to claim 6, wherein the write controlling includes writing the second mirror data in a mirror area of a fourth encryption buffer when data has been stored in the mirror area of the third encryption data.

8. The method according to claim 7, further comprising storage-status notifying including transmitting storage status information indicating that there is no data in the mirror area of the second encryption buffer, when the data that had been stored in the mirror area of the second encryption buffer is not present, wherein the write controlling includes, upon reception of the storage status information transmitted at the storage-status notifying, writing the second mirror data in the mirror area of the second encryption buffer.

9. The method according to claim 6, further comprising suspending including, when a failure occurs in the second encryption buffer that stores therein the second mirror data corresponding to the first local data stored in the local area of the first encryption buffer, and a failure occurs in the third encryption buffer, retaining unencrypted data in the second encryption buffer and suspending the processing of the unencrypted data.

10. The method according to claim 6, further comprising restoring which includes, when the third encryption buffer that stores therein the second local data corresponding to the first mirror data stored in the mirror area of the first encryption buffer is restored, issuing an instruction to write the first mirror data stored in the mirror area of the first encryption buffer in the local area of the third encryption buffer.

11. The method according to claim 10, wherein the restoring further includes, when unencrypted data to be stored in a mirror area of a different encryption buffer is included in the local area of own encryption buffer, storing the unencrypted data in the mirror area.

12. A storage comprising:
a disk drive that stores therein data; and
a code conversion apparatus that encrypts and decrypts the data stored in the disk drive, wherein the code conversion apparatus includes
an encrypted-data storage unit that stores, in a code buffer in the storage, first encrypted data present in the disk drive;
an unencrypted-data storage unit that stores, in an encryption buffer in the storage, first unencrypted data present in the disk drive, the encryption buffer being divided into a local area for storing therein unencrypted data as first local data and a mirror area for storing therein unencrypted data as first mirror data corresponding to second local data stored in a different encryption buffer;
an encrypting unit that encrypts the first unencrypted data present in the encryption buffer to predetermined encrypted data;
a decrypting unit that decrypts the first encrypted data present in the code buffer to second unencrypted data;
a re-encrypting unit that decrypts the first encrypted data present in the code buffer to third unencrypted data and encrypts the third unencrypted data to second encrypted data different from the first encrypted data;
a monitoring unit that monitors a progress of data including monitoring whether data is at least one of being encrypted and decrypted by any one of the encrypting unit, the decrypting unit, and the re-encrypting unit; and
a read/write controlling unit that includes controlling read/write of data based on a read/write request based on the progress monitored by the monitoring unit, upon reception of the read/write request for requesting the disk drive to read and write data when the data is being encrypted and decrypted by any one of the encrypting unit, the decrypting unit, and the re-encrypting unit, wherein
the read/write controlling unit includes, upon reception of the read/write request for requesting read of target data including data currently being decrypted, waiting completion of decryption of the data, dividing the target data into fourth encrypted data and sixth unencrypted data after the decryption of the data is completed, reading the fourth encrypted data and the sixth unencrypted data, decrypting the fourth encrypted data to seventh unencrypted data, combining the sixth unencrypted data and the seventh unencrypted data, and controlling reading of the combined data,
the read/write controlling unit issues an instruction to write the first local data in the local area in a first encryption buffer and writes second mirror data corresponding to the first local data in a mirror area of a second encryption buffer,
the encrypting unit, when a failure occurs in the first encryption buffer and the second mirror data corresponding to the first local data stored in the first encryption buffer is stored in the mirror area of the second encryption buffer, decrypts the second mirror data to the predetermined encrypted data and writes the predetermined encrypted data to the disk drive,
the decrypting unit, when a failure occurs in the first encryption buffer and the second mirror data corresponding to the first local data stored in the first encryption buffer is stored in the mirror area of the second encryption buffer, writes the second mirror data to the disk drive, and
the re-encrypting unit, when a failure occurs in the first encryption buffer and the second mirror data corresponding to the first local data stored in the first encryption buffer is stored in the mirror area of the second encryption buffer, encrypts the second mirror data to different encrypted data and writes the different encrypted data to the disk drive.

* * * * *